United States Patent [19]
Chikazawa et al.

[11] Patent Number: 5,818,816
[45] Date of Patent: Oct. 6, 1998

[54] COMMUNICATION DEVICE FOR SWITCHING CONNECTION FROM A WORKING CHANNEL LINE TO A PROTECTION CHANNEL LINE AND VICE VERSA

[75] Inventors: Tsutomu Chikazawa, Kawasaki; Jun Wakabayashi, Yokohama; Masaaki Iwasaki; Seiji Nakazumi, both of Kawasaki, all of Japan

[73] Assignee: Fujitsu Limited, Kanagawa, Japan

[21] Appl. No.: 613,000

[22] Filed: Mar. 8, 1996

[30] Foreign Application Priority Data

Sep. 29, 1995 [JP] Japan .................................... 7-253735

[51] Int. Cl.⁶ ...................................... H04J 1/16
[52] U.S. Cl. .......................... 370/225; 379/221
[58] Field of Search .................... 370/221, 222, 370/223, 224, 227, 228; 340/825.01, 827; 379/221; 445/8; 395/181

[56] References Cited

U.S. PATENT DOCUMENTS

| 4,393,493 | 7/1983 | Edwards | 370/228 |
|---|---|---|---|
| 4,680,776 | 7/1987 | Ikeuchi et al. | 375/40 |
| 5,343,464 | 8/1994 | Iino et al. | 370/227 |
| 5,442,620 | 8/1995 | Kremer | . |
| 5,446,725 | 8/1995 | Ishiwatari | . |
| 5,452,286 | 9/1995 | Kitayama | 370/228 |
| 5,495,472 | 2/1996 | Ohara | 370/224 |
| 5,532,862 | 7/1996 | Tada et al. | 359/161 |

*Primary Examiner*—Hassan Kizou
*Assistant Examiner*—A. Bnmmoussa
*Attorney, Agent, or Firm*—Helfgott & Karas P.C.

[57] ABSTRACT

A communication device includes a time switch array unit which performs a switching of transmission lines. A switch unit performs a switching connection from a protection channel line among the transmission lines to a working channel line, for each channel formed in the transmission lines. A bridge unit performs a switching connection from a working channel line among the transmission lines to a protection channel line, for each channel formed in the transmission lines. A control unit performs a recovery of a signal transmission on the working channel lines by controlling the switching connections of the switch unit and the bridge unit.

7 Claims, 22 Drawing Sheets

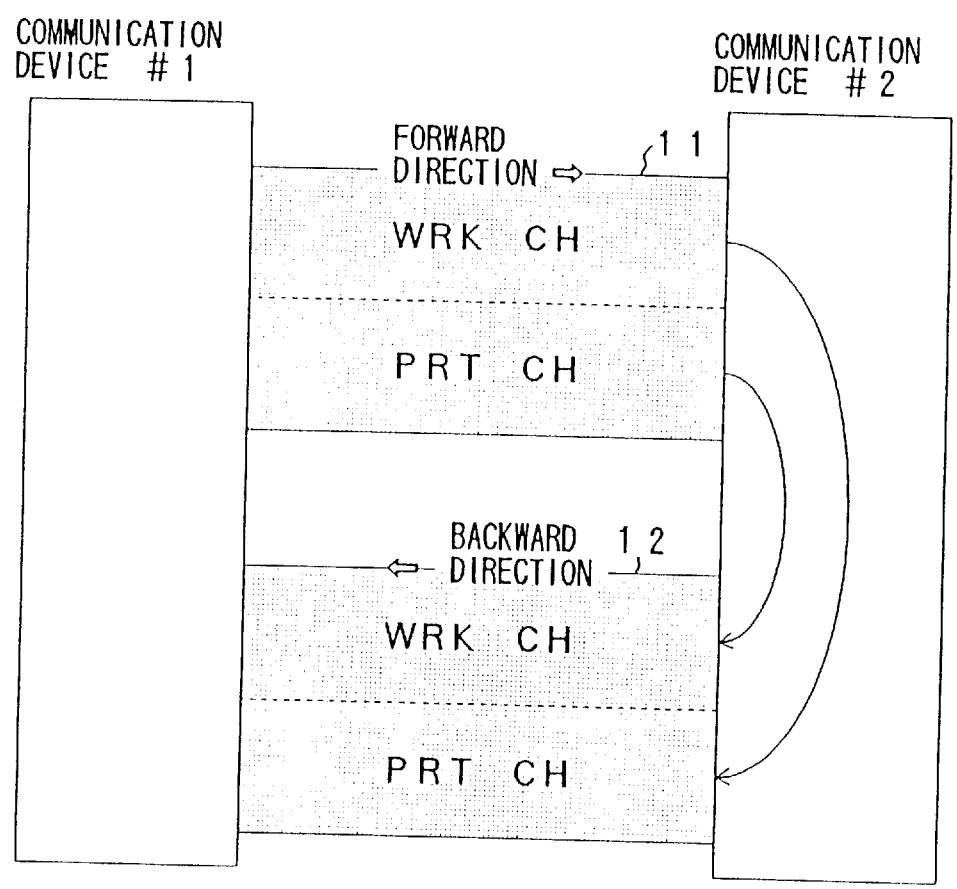
F I G. 4

COMMUNICATION DEVICE FOR SWITCHING CONNECTION FROM A WORKING CHANNEL LINE TO A PROTECTION CHANNEL LINE AND VICE VERSA

BACKGROUND OF THE INVENTION

1. Field of the Invention

The present invention generally relates to a network including a plurality of communication devices connected together via transmission lines or radio waves, and more particularly to a redundant-structure network in which a plurality of communication devices are connected to each other by both working channel lines and protection channel lines, and a method of a switching connection from the working channel lines to the protection channel lines or vice versa.

2. Description of the Related Art

For a network including a plurality of stations connected to each other by transmission lines, a redundant structure of communication channel lines is utilized in order to prevent an interruption of a communication service due to a failure such as an open line of the transmission line, or to minimize a degradation of quality of the communication service.

The redundant structure of the communication channels is such that working channel lines and protection channel lines between the respective two stations in the network are provided. The working channel lines can provide communication services of a plurality of channels. During a normal operation of the network, the working channel lines between the respective two stations in the network are used to transmit signals. Upon occurrence of a certain failure in the working channel lines, switching connections from the working channel lines to the protection channel lines are carried out in the above redundant-structure network, and the protection channel lines are used instead as the transmission lines between the stations where the failure has occurred.

If the protection channel lines have a capacity of data transmission which is the same as that of the working channel lines, a recovery of the connections of the working channel lines is completely realized by carrying out the switching connections from the working channel lines to the protection channel lines upon the occurrence of failure.

FIG. 1 shows a redundant-structure network including a plurality of communication devices (which are called stations or nodes) A, B, C and D. In this network, the stations A, B, C and D are linked together via transmission lines in a ring-like formation. The transmission lines between the stations are, for example, two optical fiber cables, and the respective stations are linked by two optical fiber cables in a bidirectional manner. The network shown in FIG. 1 is, for example, a SONET (synchronous optical network) system or a CEPT (Conference of European Postal and Telecommunications Administration) system.

The network shown in FIG. 1 is a hierarchical system, and secondary devices (not shown) are connected to each of the stations A through D via transmission lines (not shown).

Each of the optical fiber cables between the stations includes the working channel lines and the protection channel lines, and a multiplexed optical signal (e.g., STS signal for the SONET system or VC3 signal for the CEPT system) are transmitted on each of the optical fiber cables. For example, when one of the optical fiber cables has a capacity of 48 channels, signals of the 1st through 24th channels are transmitted on the working channel lines and signals of the 25th through 48th channels are transmitted on the protection channel lines. A rate of transmission of these signals on the working channel lines and the protection channel lines is lower than a rate of transmission of the multiplexed optical signal.

Suppose that an open line of the optical fiber cables between the station A and the station B has occurred in the network shown in FIG. 1. Upon the occurrence of this failure, the station B cannot transmit a multiplexed optical signal directly to the station A via the optical fiber cable between the stations A and B. As indicated by reference numeral 10 in FIG. 1, the station B outputs the multiplexed optical signal to the optical fiber cable connected to the station C, instead of the optical fiber cable that has failed. The multiplexed optical signal from the station B is transmitted to the station C on this optical fiber cable. At this time, an optical signal, sent from the station C to the station B, is looped back to the station C. The looped-back signal from the station B is also transmitted to the station C on the protection channel line, included in the optical fiber cable between the stations B and C. The looped-back signal from the station B passes through the stations C and D and is delivered to the station A.

When the above failure has occurred, an optical signal from the station A cannot be transmitted directly to the station B via the optical fiber cable between the stations A and B. Similarly to the above procedure, the optical signal from the station A passes through the stations D and C and is delivered to the station B. Accordingly, upon occurrence of failure, a bypass transmission path is established in the above redundant-structure network to transmit signals, and an interruption of a communication service due to the failure can be prevented.

The network shown in FIG. 1 is called the bidirectional loopback switch ring system.

However, the above method of the transmission line switching is such that, upon occurrence of failure, all the working channel lines between the stations where the failure has occurred are completely switched to the protection channel lines between those stations in order to continue to provide a communication service without interruption.

The above method of the transmission line switching is not suitable for another network which provides a communication service by utilizing the working channel lines and provides an additional communication service by utilizing a part of the protection channel lines during a normal operation of the network, in order to efficiently utilize the resources of the network. If the above method of the transmission line switching is applied to the network of this kind, all the working channel lines are completely switched to the protection channel lines when a failure in this network has occurred. Although an interruption of the communication service provided with the working channel lines can be prevented by the switching to the protection channel lines, it is impossible to continue to provide the additional communication service with the part of the protection channel lines upon the occurrence of the failure. Since all the protection channel lines are used as the transmission lines, the additional communication service, provided with the part of the protection channel lines, interrupts until a recovery from the failure is completed.

When an operating ratio of the working channel lines in the network is large, the interruption of the additional communication service due to the failure may be permissible. However, when the operating ratio of the working channel lines is not large, the interruption of the additional communication service utilizing the part of the protection channel lines is unacceptable. For example, in a case in which one third of the channels in the working channel lines are invariably not used and the remaining channels are used to provide a communication service, if the above transmission line switching is carried out upon occurrence of failure, not only the used channels of the working channel lines but also the unused channels of the working channel lines are switched to the protection channel lines. In this case, an interruption of another communication service provided with a part of the protection channel lines cannot be avoided.

SUMMARY OF THE INVENTION

An object of the present invention is to provide an improved communication device in which the above-mentioned problems are eliminated.

Another object of the present invention is to provide a communication device which improves the method of the switching connection for the working channel lines and the protection channel lines to efficiently utilize the capacity of the redundant-structure transmission lines, thereby preventing the interruption of the communication service and the degradation of the quality of the communication service upon the occurrence of a failure in the network.

The above-mentioned objects of the present invention are achieved by a communication device provided within a network in which signals are transmitted bidirectionally on transmission lines, the transmission lines including working channel lines and protection channel lines, the communication device comprising: a time switch array unit performing a switching of the transmission lines; a switch unit performing a switching connection from one protection channel line among the transmission lines to a predetermined working channel line, for each channel formed in the transmission lines; a bridge unit performing a switching connection from one working channel line among the transmission lines to a predetermined protection channel line, for each channel formed in the transmission lines; and a control unit performing a recovery of a signal transmission on the working channel lines by controlling the switching connections of the switch unit and the bridge unit.

The communication device of the present invention controls the switching connection from one protection channel line to the predetermined working channel line and the switching connection from one working channel line to the predetermined protection channel line, for each channel formed in the transmission lines, upon the occurrence of a failure in the network. This is not the switching from all the working channel lines to the protection channel lines. The communication device of the present invention can produce a bypass transmission path for each channel upon the occurrence of a failure in the network by carrying out the switching connection, so that a recovery of the signal transmission on the line that has failed is performed by using the bypass transmission path. The communication device of the present invention makes it possible to efficiently utilize the capacity of the redundant-structure transmission lines in the network.

BRIEF DESCRIPTION OF THE DRAWINGS

The above and other objects, features and advantages of the present invention will become more apparent from the following detailed description when read in conjunction with the accompanying drawings in which:

FIG. 4 is a diagram of an arrangement of transmission lines which connect two communication devices;

DESCRIPTION OF THE PREFERRED EMBODIMENT

A description will now be given of the preferred embodiments of the present invention with reference to the accompanying drawings.

Figure 2:
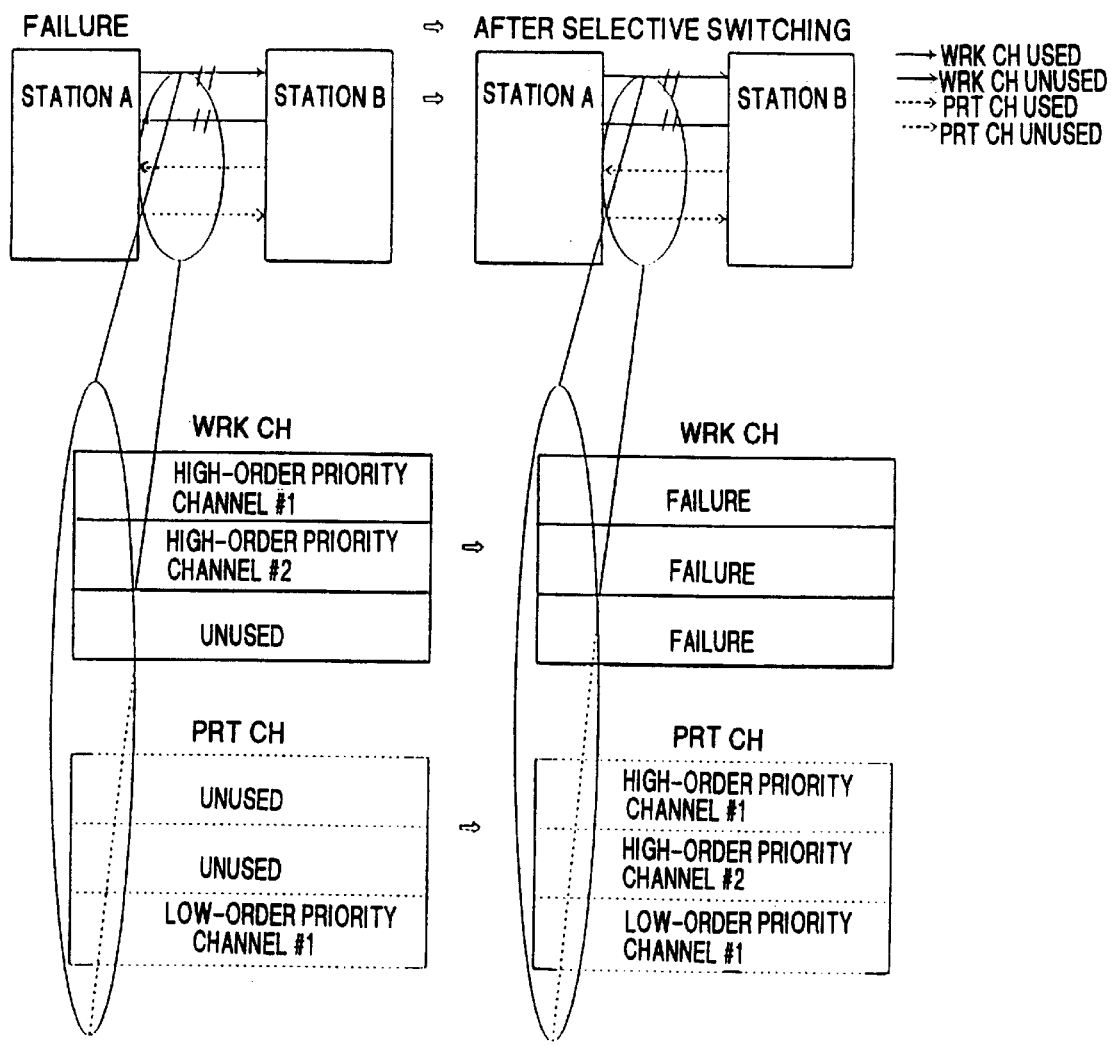
FIG. 2 is a diagram for explaining a method of a switching connection as a basic concept of the present invention.

FIG. 2 shows a method of a switching connection which is a basic concept of the present invention. Referring to FIG. 2, a station A and a station B are connected to each other by working channel (WRK CH) lines and protection channel (PRT CH) lines. In FIG. 2, the WRK CH lines which are used are indicated by a broad solid line arrow, the WRK CH lines which are not used are indicated by a thin solid line arrow, the PRT CH lines which are used are indicated by a broad dotted line arrow, and the PRT CH lines which are not used are indicated by a thin dotted line arrow.

During a normal operation, two-thirds of the channels in the WRK CH lines between the two stations A and B are used as a high-order priority channel #1 and a high-order priority channel #2 line, and one-third of the channels in the WRK CH lines remain unused. Further, during a normal operation, two-thirds of channels in the PRT CH lines between the two stations A and B remain unused and one-third of the channels are used as a low-order priority channel #1.

Upon occurrence of a failure in the WRK CH lines between the stations A and B, the method of the switching connection of the present invention allows two-third of the channels in the PRT CH lines to be changed to the high-order priority channel #1 and the high-order priority channel #2, and allows one-third of the channels in the PRT CH lines to be retained as the low-order priority channel #1, as shown in FIG. 2.

In the case of the previously-mentioned conventional method, the channels in the protection channel lines are changed to the high-order priority channel #1, the high-order priority channel #2, and the unused channel line after the switching is carried out upon the occurrence of the failure in the working channel lines.

Figure 3:
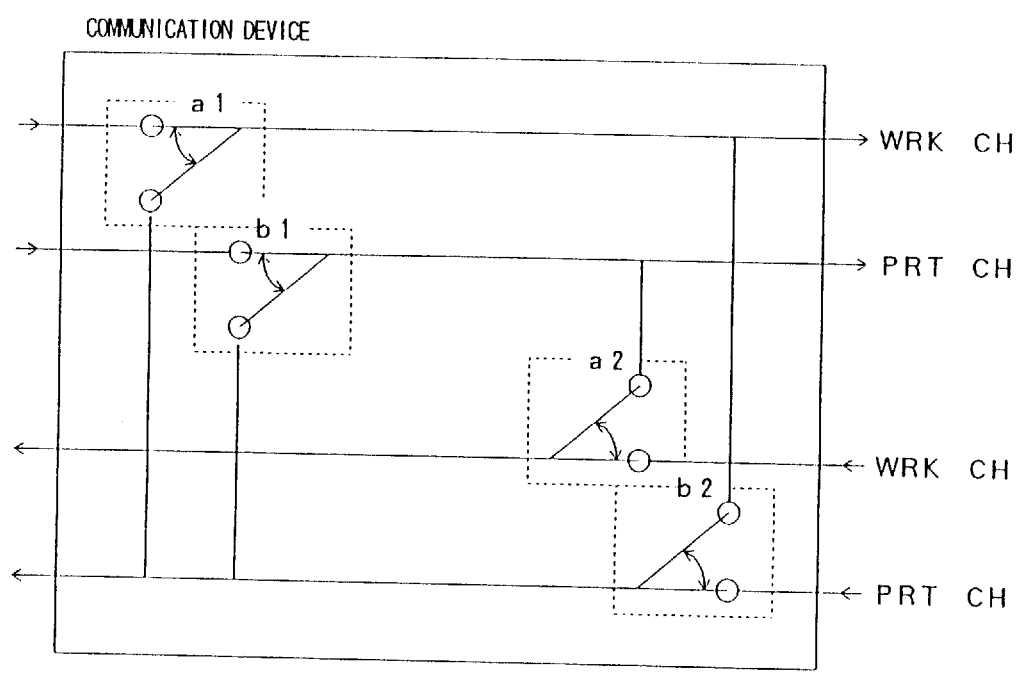
FIG. 3 is a diagram of a main portion of a communication device in one embodiment of the present invention.

To realize the above-described switching connection of the transmission lines, the communication device of the present invention includes a switch unit provided on each WRK CH line and a bridge unit provided on each PRT CH line. FIG. 3 shows a main portion of the communication device in one embodiment of the present invention, having the above structure in which the switch unit and the bridge unit are provided.

Referring to FIG. 3, a switch unit a1 and a switch unit a2 on bidirectional working channel (WRK CH) lines, and a bridge unit b1 and a bridge unit b2 on bidirectional protection channel (PRT CH) lines are provided. The switch units a1 and a2 constitute a switching unit which connects the PRT CH lines to the WRK CH lines. The bridge units b1 and b2 constitutes a switching unit which connects the WRK CH lines to the PRT CH lines.

In the communication device of the present invention, the switch units a1 and a2 on the bidirectional WRK CH lines and the bridge units b1 and b2 on the bidirectional PRT CH lines are provided, and controlling the switch units a1 and a2 and the bridge units b1 and b2 for the transmission lines in accordance with required conditions provides the method of the above switching connection of the transmission lines which is shown in FIG. 2.

FIG. 4 shows an arrangement of transmission lines which interconnect two communication devices #1 and #2. The communication devices #1 and #2 are connected to each other by two transmission lines 11 and 12 in a bidirectional manner. The transmission lines 11 and 12 are optical fiber cables. In each optical fiber cable, both the working channels (WRK CH) and the protection channels (PRT CH) are formed. In the arrangement shown in FIG. 4, the switch unit for each WRK CH line and the bridge unit for each PRT CH line are provided similarly to those shown in FIG. 3.

In the arrangement shown in FIG. 4, signals from the communication device #1 are transmitted on the transmission line 11 to the communication device #2 in a forward direction, and signals from the communication device #2 are transmitted on the transmission line 12 to the communication device #1 in a backward direction. That is, the signals from the communication device #1 can be looped back by the communication device #2 to the communication device #1. The loopback operation for each channel is controllable in the arrangement of FIG. 4.

Figure 5:
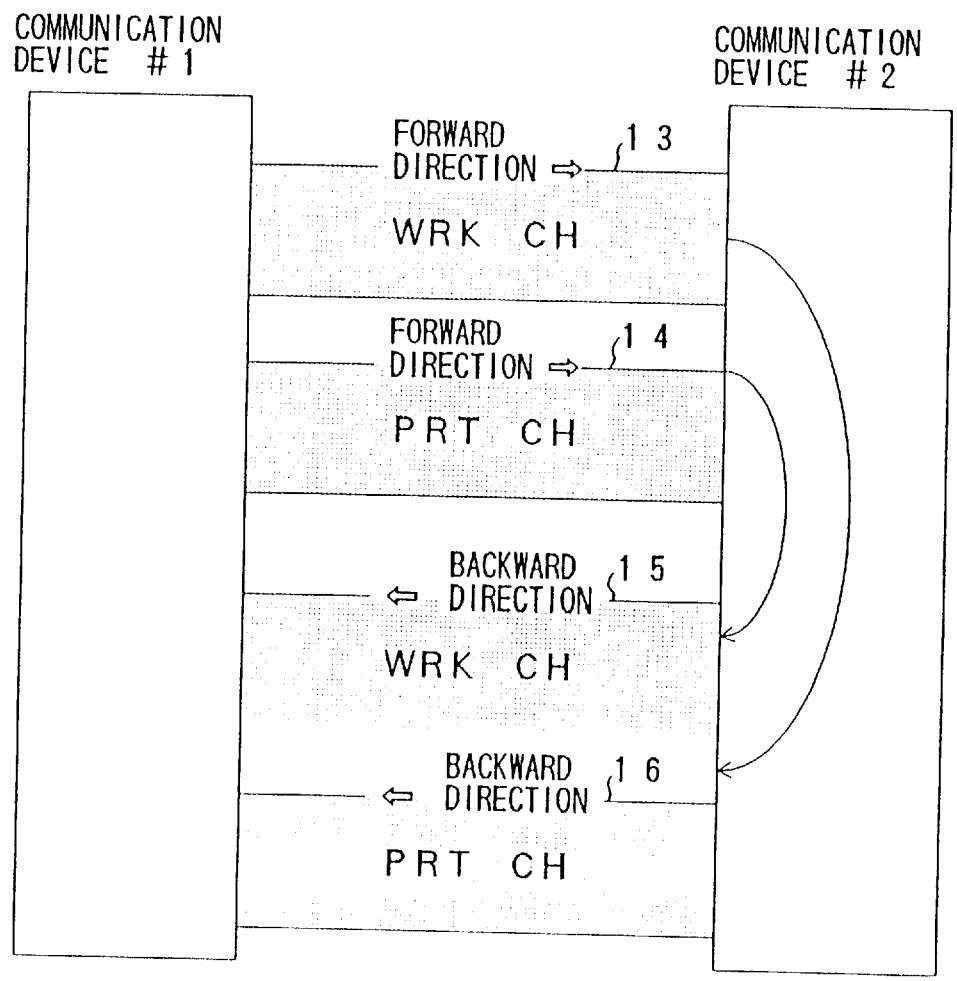
FIG. 5 is a diagram of another arrangement of transmission lines which connect two communication devices.

FIG. 5 shows another arrangement of transmission lines which interconnect the two communication devices #1 and #2. The communication devices #1 and #2 are connected to each other by four transmission lines 13, 14, 15 and 16 in a bidirectional manner. The transmission lines 13 through 16 are optical fiber cables. In each optical fiber cable, either the working channels (WRK CH) or the protection channels (PRT CH) are formed. In the arrangement shown in FIG. 5, the switch unit for each WRK CH line and the bridge unit for each PRT CH line are provided similarly to those shown in FIG. 3. The arrangement of the switch units and the bridge units in the communication device of the present invention does not depend on the physical form of the transmission lines in which the WRK CH and the PRT CH are formed.

As described above, the communication device of the present invention is capable of controlling the switch units and the bridge units for the transmission lines in accordance with required conditions, and this can realize the method of the above switching connection of the transmission lines. A detailed description thereof will now be given with reference to FIGS. 6A, 6B and 6C. Especially, a method of controlling the switch units and the bridge units with respect to a working channel WRK CH1 and a protection channel PRT CH1 will be described.

Figure 6A:
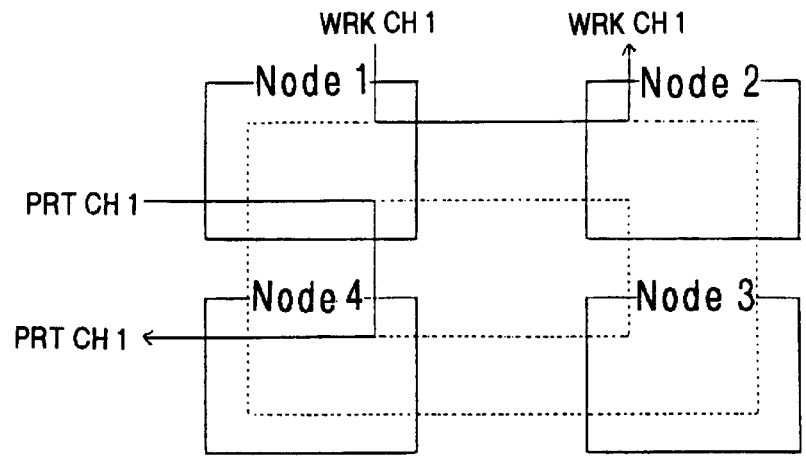
FIGS. 6A, 6B and 6C are diagrams for explaining a method of a switching connection of the present invention which is carried out upon occurrence of failure.
Figure 6B:
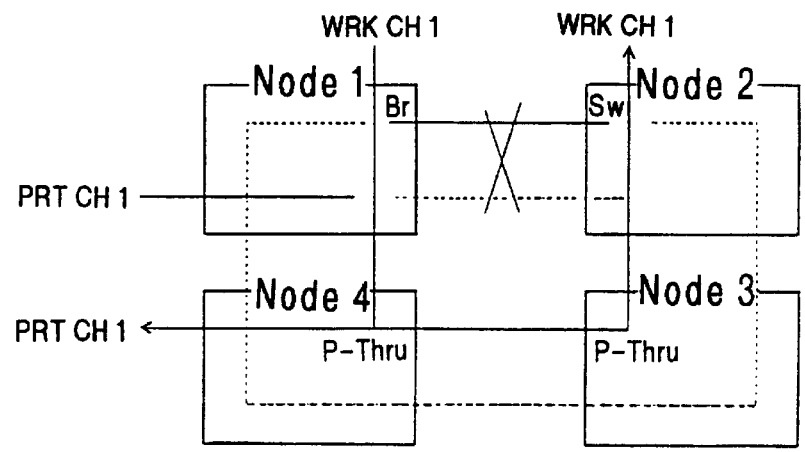
Figure 6C:
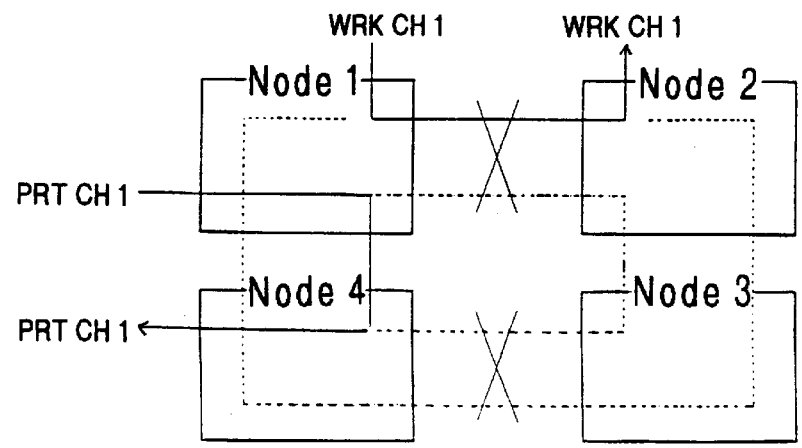

In FIGS. 6A, 6B and 6C, a channel line which is used to make the cross connection between the nodes is indicated by a solid line, and a channel line which is not used to make the cross connection between the nodes is indicated by a dotted line.

FIG. 6A shows a normal condition of a network including four communication devices (Node 1, Node 2, Node 3 and Node 4). In the normal condition of the network, no failure in the lines between the nodes takes place. The communication devices Node 1 through Node 4 are connected in a ring formation by transmission lines. A working channel WRK CH1 in the working channel line between the Nodes 1 and 2 is formed by making a cross connection between the Node 1 and the Node 2. A protection channel PRT CH1 in the protection channel line between the Nodes 1 and 4 is formed by making a cross connection between the Node 1 and the Node 4. An additional communication service is provided by transmitting a signal from the Node 1 on the PRT CH1 line to the Node 4 during a normal operation of the network.

FIG. 6B shows a failure condition of the above network. In the failure condition shown in FIG. 6B, a failure in the working channel line between the Nodes 1 and 2 has occurred, and no failure in other portions of the network takes place. Upon occurrence of this failure, a switching connection from the WRK CH1 line to the PRT CH1 line is carried out in the network. That is, a recovery of the WRK CH1 is performed by using the PRT CH1 line between the Node 1 and Node 4, the transmission line between the Node 4 and the Node 3, and the transmission line between the Node 3 and the Node 2. For this reason, the signal transmitted on the PRT CH1 line between the Node 1 and the Node 4 for the additional communication service is changed to an OFF state after the recovery of the WRK CH1 is done.

In FIG. 6B, "Br" indicates a bridge-on action of the bridge unit of the Node 1, "Sw" indicates a switch-on action of the switch unit of the Node 2, and "P-Thru" indicates a pass-through condition of each of the Nodes 3 and 4.

In the communication device of the present invention, providing the communication service by using the PRT CH1 line is maintained with no interruption, if it is possible. However, if establishing a bypass transmission path with the protection channel line for the recovery of the WRK CH1 is preferential, the communication devices of the Nodes 1–4 of the network carry out the switching connection from the WRK CH1 line to the PRT CH1 line, as shown in FIG. 6B, upon the occurrence of the failure.

FIG. 6C shows another failure condition of the network. When the failure is in the transmission lines between the Node 1 and Node 2, a further failure in the transmission lines between the Node 3 and Node 4 has occurred. If this multiple failure has occurred, there is no bypass transmission path, for the recovery of the WRK CH1 line having failed, in the network. The switching connection from the WRK CH1 line to the PRT CH1 line, shown in FIG. 6B, is canceled by the communication devices of the Nodes 1–4. Thus, the interruption of the communication service provided by using the protection channel line is prevented. The transmission of signals on the PRT CH1 line between the Node 1 and the Node 4 is enabled, and a restart for providing the communication service with the protection channel line is allowed. The communication devices of the Nodes 1–4 can prevent the WRK CH1 line between the Nodes 1 and 2 from being erroneously switched to the PRT CH1 line.

Figure 7:
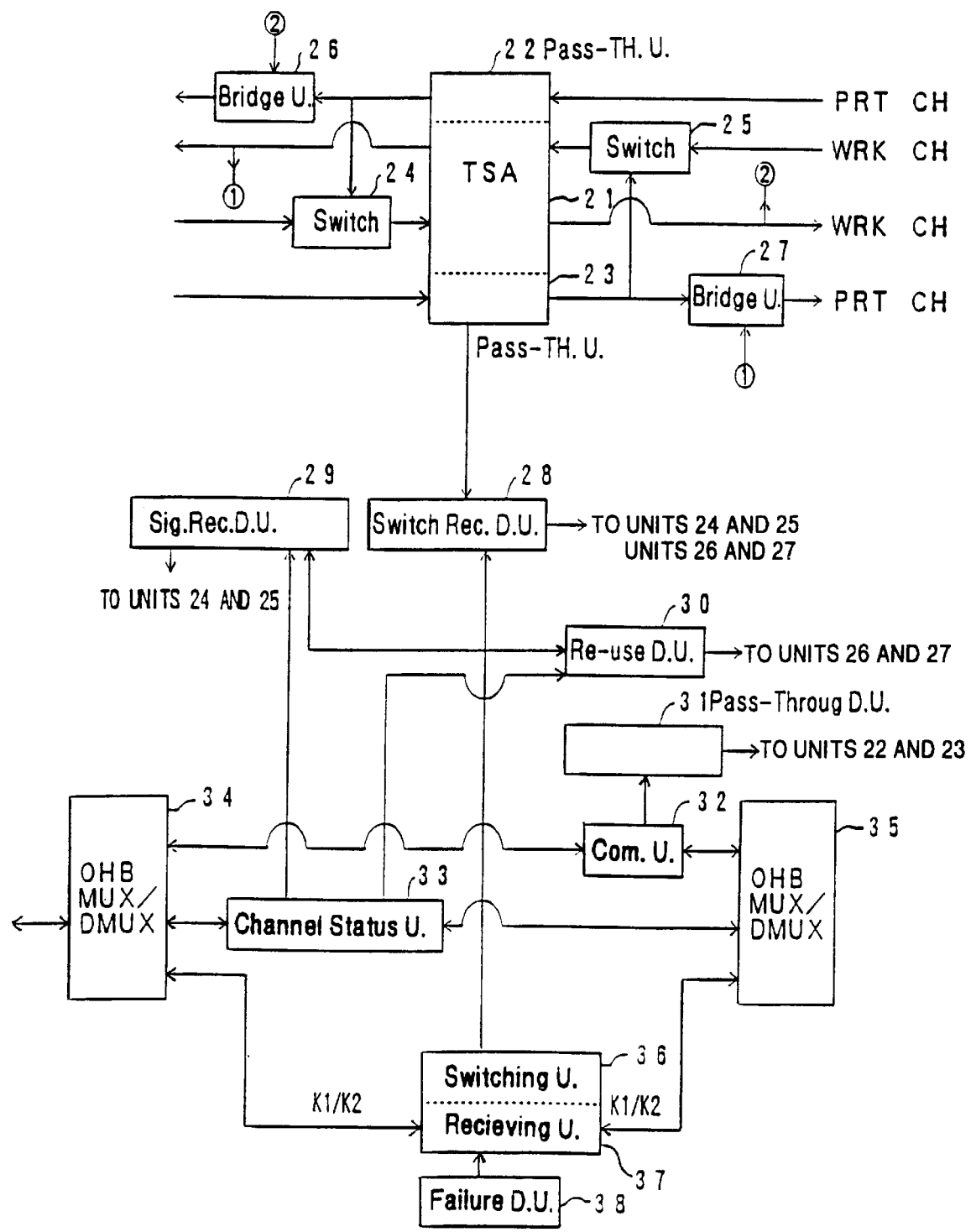
FIG. 7 is a block diagram of a communication device in one embodiment of the present invention.

FIG. 7 shows a communication device in one embodiment of the present invention. Referring to FIG. 7, this communication device includes a TSA (time switch array) unit 21, pass-through units 22 and 23, switch units 24 and 25, and bridge units 26 and 27. The switch units 24 and 25 and the bridge units 26 and 27, shown in FIG. 7, correspond to the switch units a1 and a2 and the bridge units b1 and b2, shown in FIG. 3, respectively.

In FIG. 7, the numeral in circle indicates a relationship of the connection of the channel related to the switch units 24 and 25 and the bridge units 26 and 27. Further, in FIG. 7, a portion where two lines intersect each other indicates the connection of the lines, and a portion where one line passes around another line indicates no connection of the lines.

The communication device shown in FIG. 7 further includes a switch request determination unit 28, a signal recovery determination unit 29, a re-use determination unit 30, a pass-through determination unit 31, a communication unit 32, a channel status unit 33, overhead multiplexer/demultiplexer (OHB MUX/DMUX) units 34 and 35, a line switching unit 36, a switch data receiving unit 37, and a failure detection unit 38.

The TSA unit 21 performs a cross connection for the working channels (WRK CH) and the protection channels (PRT CH). The pass-through units 22 and 23 pass signals on the PRT CH lines in the forward and backward directions. The pass-through determination unit 31 determines whether the signal on one of the PRT CH lines is passed through the pass-through unit 22, and determines whether the signal on the other PRT CH line is passed through the pass-through unit 23, in accordance with data output from the communication unit 32.

The line switching unit 36 determines whether turning ON the switch units or the bridge units is needed when a failure in the transmission lines has occurred. The failure occurring in the transmission lines is detected by the failure detection unit 38. For example, the occurrence of the failure is detected when no optical signal arrives at the failure detection unit 38 in the communication device within a predetermined period. A detection signal from the failure detection unit 38 is output to the line switching unit 36. In response to the detection signal, the line switching unit 36 outputs a switch command to the switch request determination unit 28.

The switch data receiving unit 37 receives a switch request or alarm data from another communication device. In accordance with the switch request or alarm data received by the switch data receiving unit 37, the line switching unit 36 outputs a switch command to the switch request determination unit 28. Upon the occurrence of failure within the present station detected by the failure detection unit 38, the line switching unit 36 outputs a switch command to the external communication devices through the switch data receiving unit 37. In a case of the SONET system, the above switch request or alarm data from another communication device is delivered by K1/K2 bytes in the LOH (line overhead) of a STS signal of the SONET system.

Figure 8:
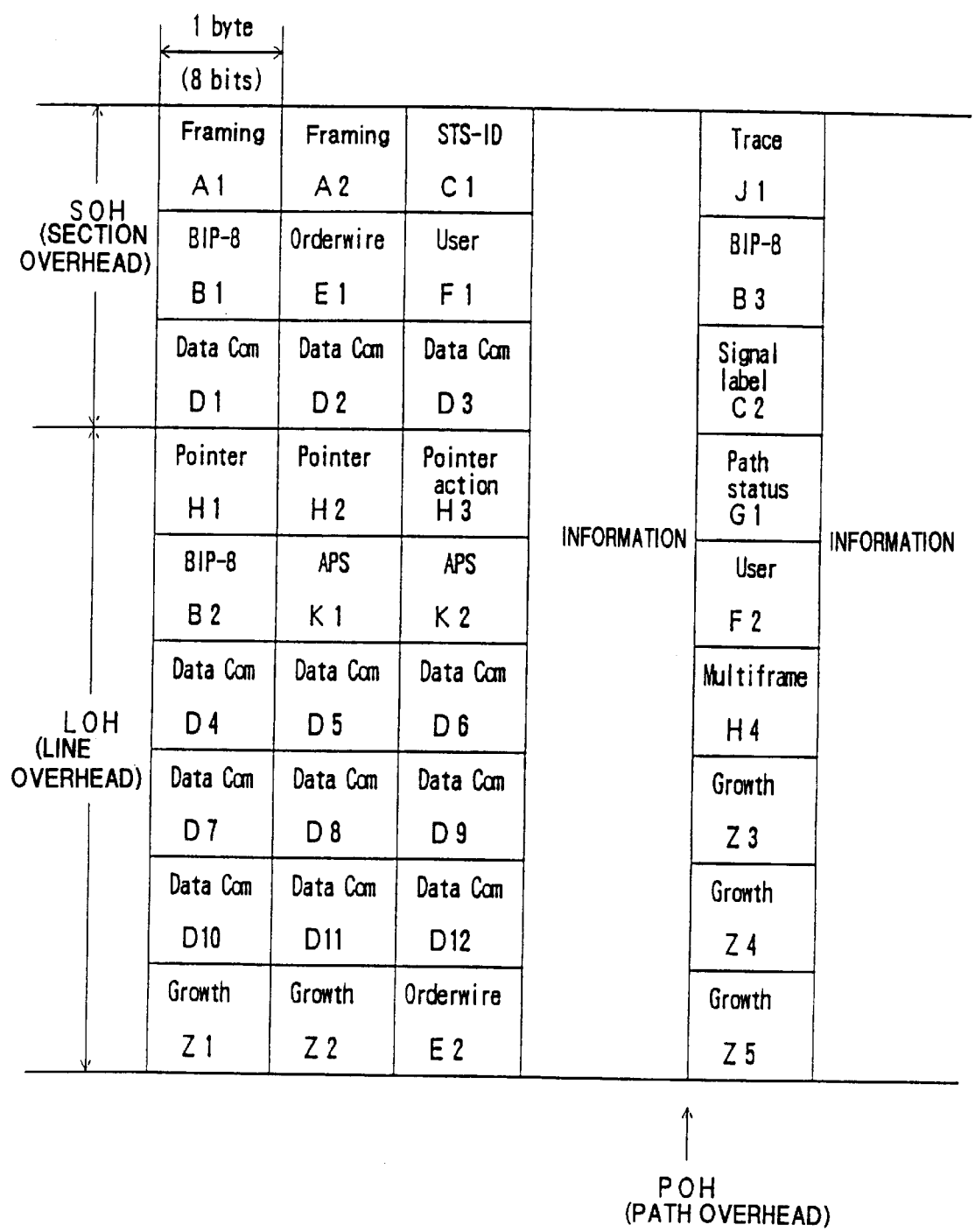
FIG. 8 is a diagram showing a frame format of a signal used in a network including the communication device in FIG. 7.

FIG. 8 shows a frame format of the STS signal of the SONET system. Regarding the frame format of the STS signal of the SONET system, the disclosure of U.S. Pat. No. 5,386,418, which was assigned to the assignee of the present invention, is incorporated by reference. The STS signal of the SONET system is configured such that one frame is constructed of a predetermined number of bits, where 1 byte represents 8 bits. Referring to FIG. 8, SOH (section overhead), LOH (line overhead), and POH (path overhead) are control data added to the information being transmitted with the STS signal. The K1/K2 bytes in the LOH of the STS signal of the SONET system, as shown in FIGS. 7 and 8, are used to deliver the above switch request or alarm data from one communication device to another.

In response to the above switch command from the line switching unit 36, the switch request determination unit 28 outputs a switch-on signal to one of the switch units 24 and 25, and/or outputs a bridge-on signal to one of the bridge units 26 and 27, for each channel formed in the transmission lines, in accordance with the channel setting data stored in an internal memory of the TSA unit 21.

Figure 1:
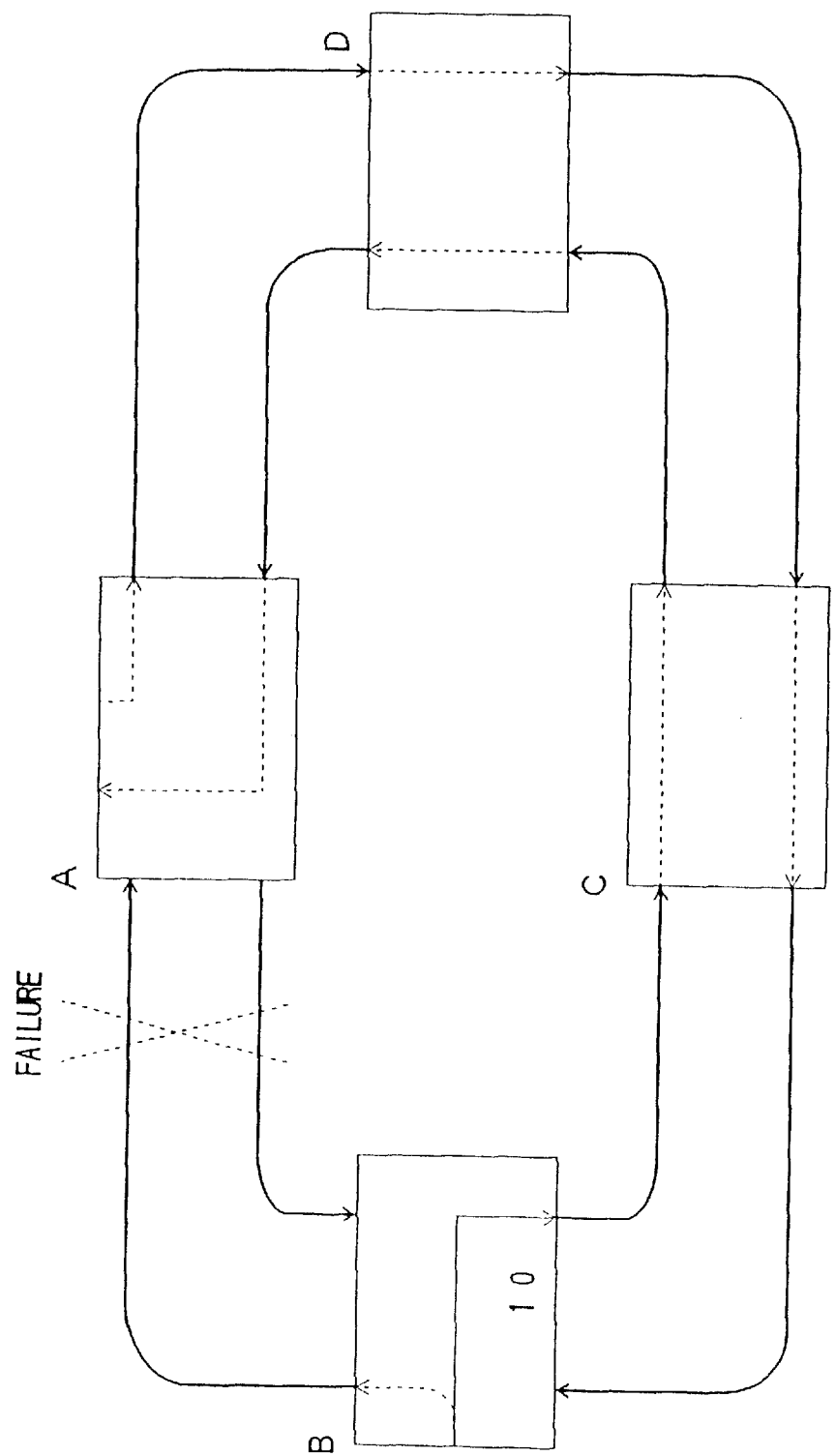
FIG. 1 is a diagram of a network in which stations are connected together via transmission lines.

The channel status unit 33 receives and manages a channel use condition of the stations of the network in a ring formation (as shown in FIG. 1), the channel use condition of the stations being centered on the present communication device.

More specifically, the channel status unit 33 receives channel setting data from an internal memory of the TSA unit 21, and the control data of the overhead of the STS signal from the OHB MUX/DMUX units 34 and 35. In response to these data, the channel status unit 33 outputs a source station identification (SOURCE ID) signal and a destination station identification (DESTINATION ID) signal, the source station and the destination station constituting the end stations of the network in the ring formation with which a cross connection is made. The SOURCE ID signal and the DESTINATION ID signal output by the channel status unit 33 are provided for each channel formed in the transmission lines.

When it is notified by the switch data receiving unit 37 according to the K1/K2 bytes of the control data that a failure in the lines in the other stations has occurred, the signal recovery determination unit 29 allows the switch unit 24 and/or the switch unit 25 to be returned to an original switching condition of the transmission line if a recovery of a signal transmission on the transmission line is not allowed.

The reuse determination unit 30 receives the K1/K2 bytes of the control data of the overhead from the switch data receiving unit 37. When the bypass transmission path (as shown in FIG. 6B) can no longer be used due to the multiple failure condition of the network (as shown in FIG. 6C), the reuse determination unit 30 allows the bridge unit 26 and/or the bridge unit 27 to be returned to an original switching condition of the transmission line in accordance with the received K1/K2 bytes.

The controlling of the signal recovery determination unit 29 and the reuse determination unit 30 is decided depending on the relationship between the location of a failure occurring in the network and the location of the communication device in the network.

In the above communication device, the line switching unit 36 and the channel status unit 33 are a single unit, and these units are shared for all the channels formed in the transmission lines.

Next, a description will be given of operations of the communication device shown in FIG. 7.

Figure 9:
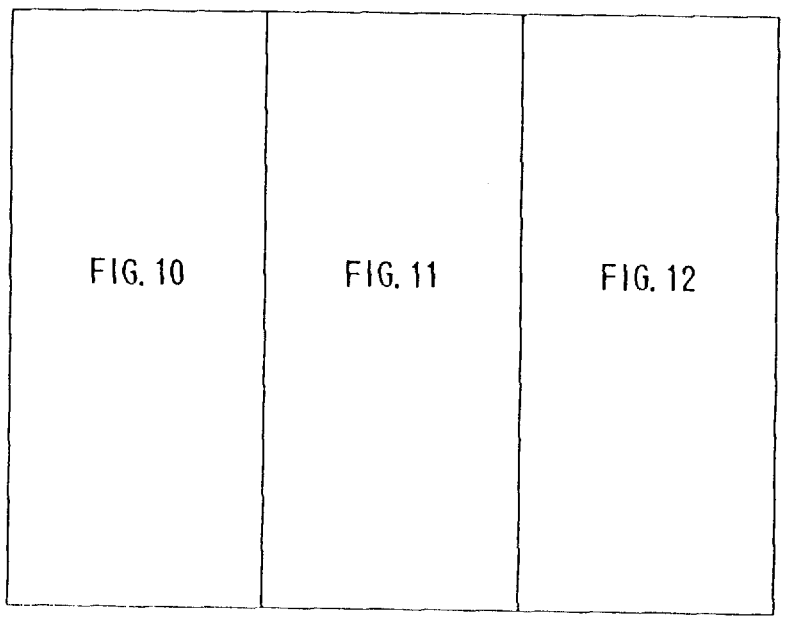
FIG. 9 is a diagram showing a relationship of the connection of FIGS. 10, 11 and 12.
Figure 10:
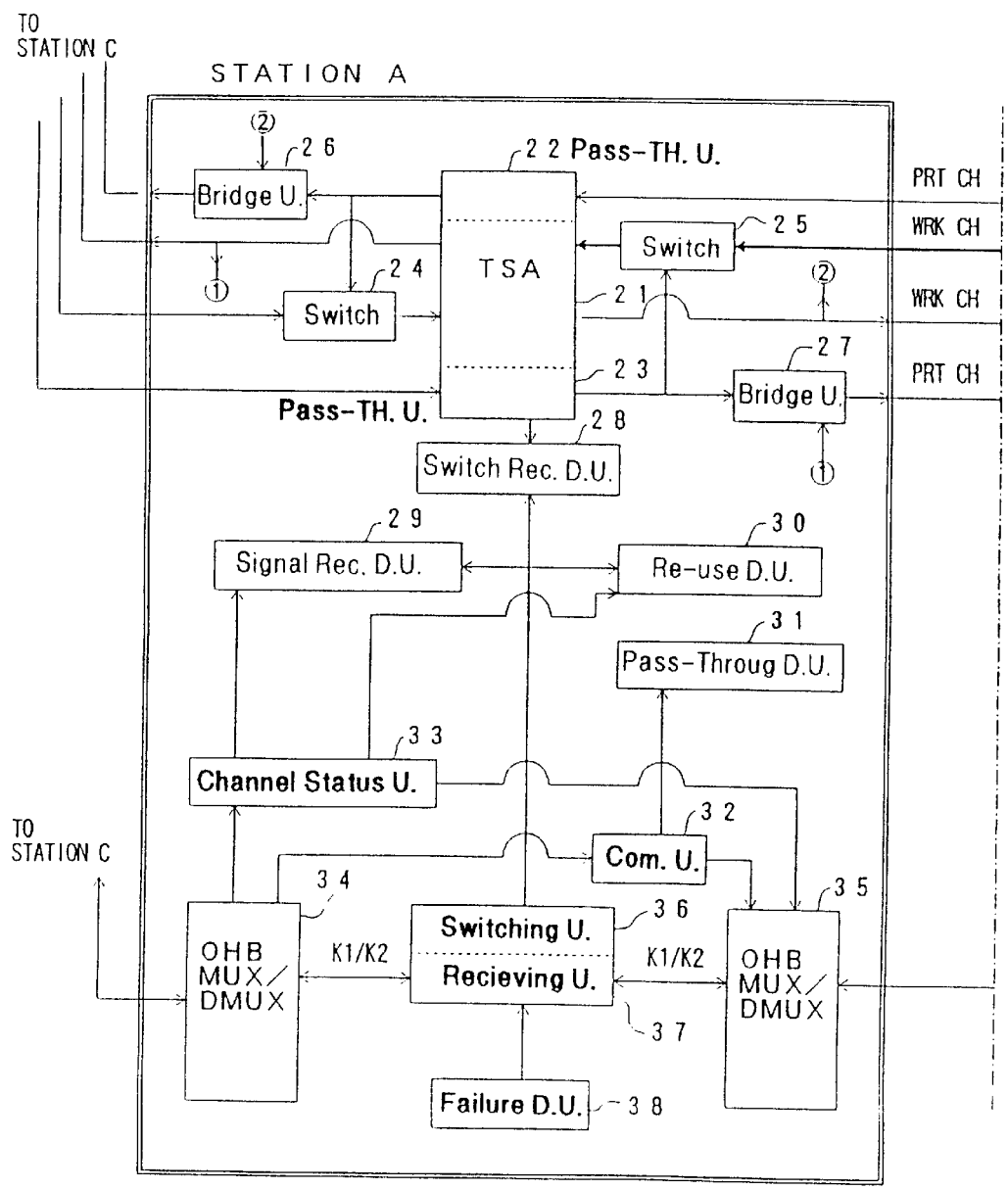
FIGS. 10, 11 and 12 are diagrams showing a normal condition of a network including the communication device in FIG. 7 and other communication devices.
Figure 11:
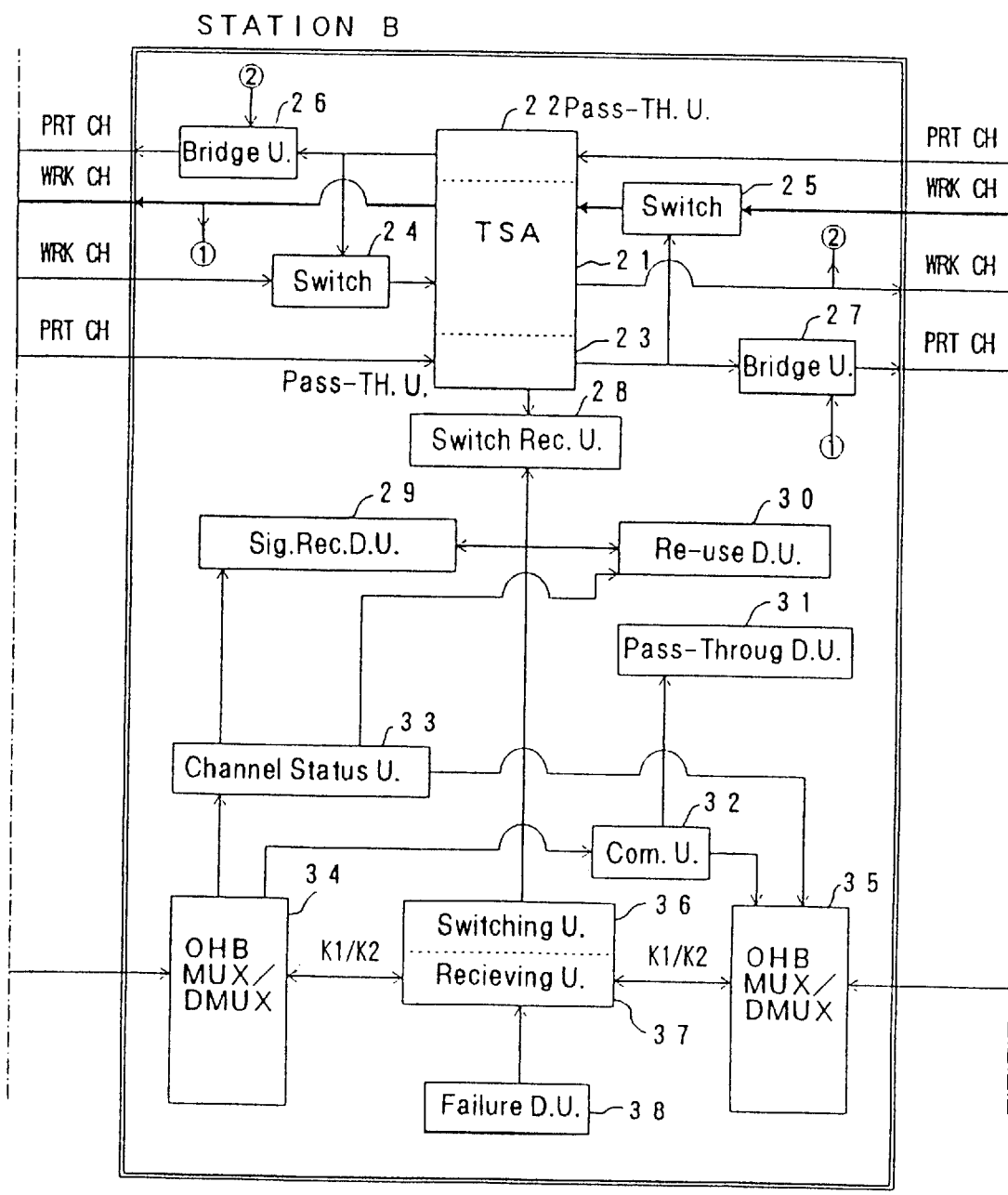
Figure 12:
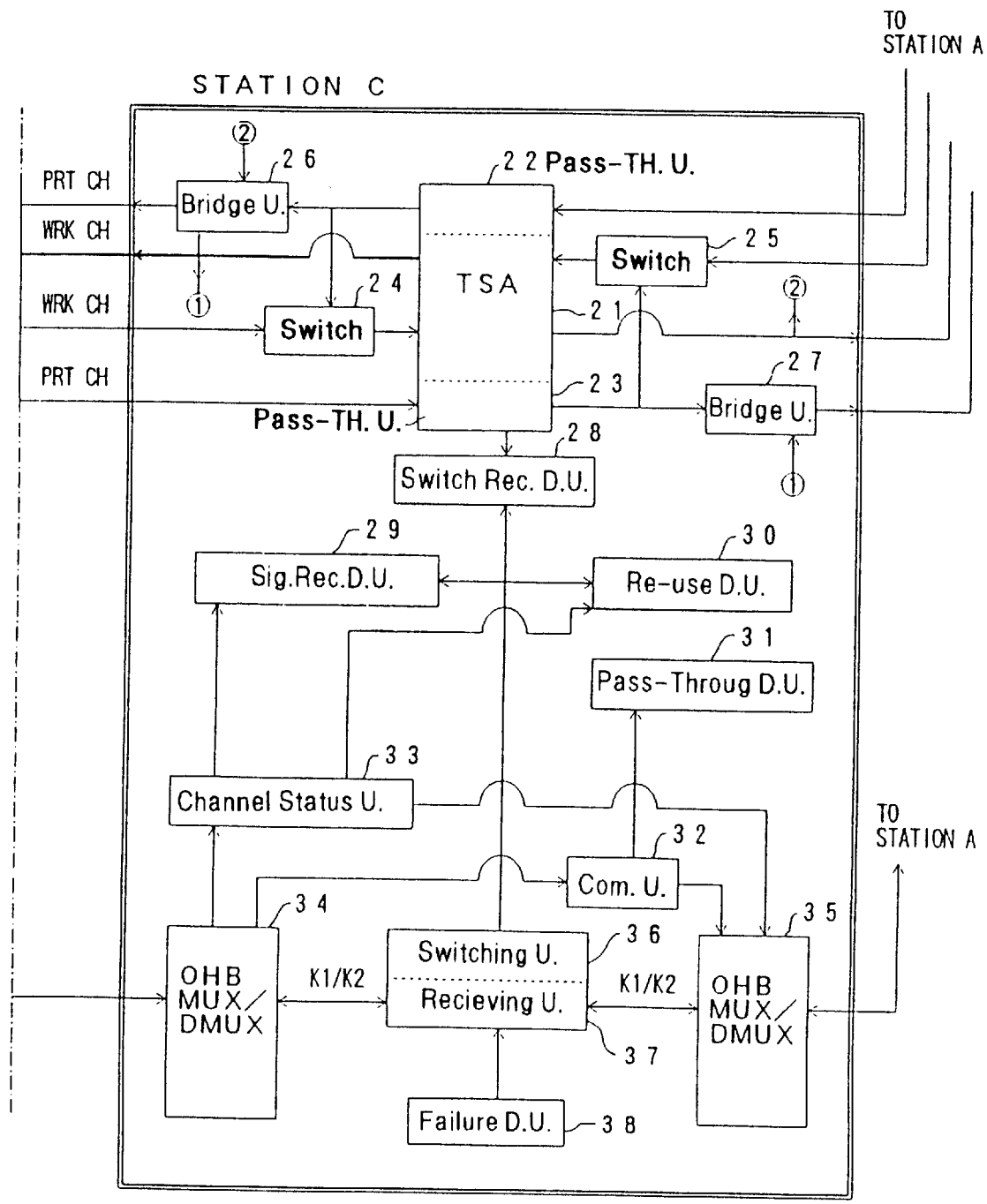

FIGS. 10, 11 and 12 show a normal condition of a network including the stations A, B and C (the communication devices). The stations A, B and C are connected in a ring formation by the transmission lines. In the normal condition, no failure in the network occurs. FIG. 9 shows a relationship of the connection of FIGS. 10, 11 and 12.

In the normal condition of the network, shown in FIGS. 10, 11 and 12, a cross connection from the station C to the station A via the station B is made. As indicated by broad lines in FIGS. 10, 11 and 12, the station C transmits a signal from the TSA unit 21 on the WRK CH line to the station B, and the station B passes the signal and transmits it on the WRK CH line to the station A. The control data of the overhead of the STS signal including the K1/K2 bytes is transmitted and received by the stations A, B and C via transmission lines which are different from the WRK CH and PRT CH lines.

Figure 13:
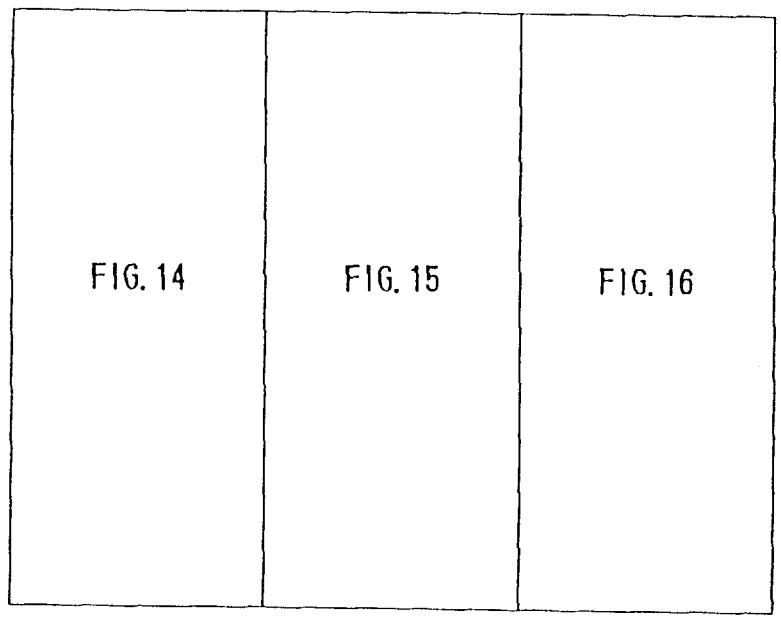
FIG. 13 is a diagram showing a relationship of the connection of FIGS. 14, 15 and 16.
Figure 14:
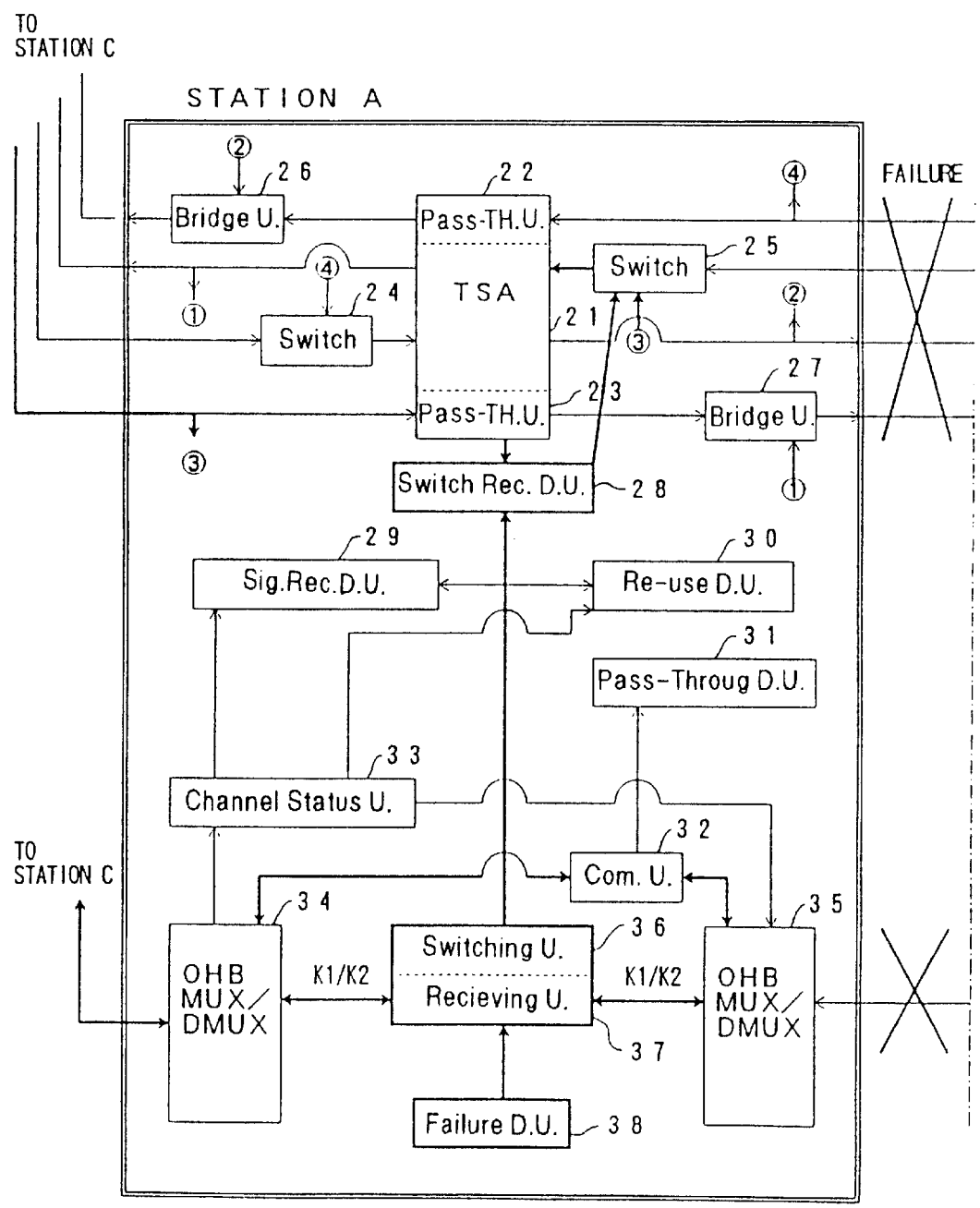
FIGS. 14, 15 and 16 are diagrams showing a condition of the network including the communication device in FIG. 7 and the other communication devices upon occurrence of a single failure.
Figure 15:
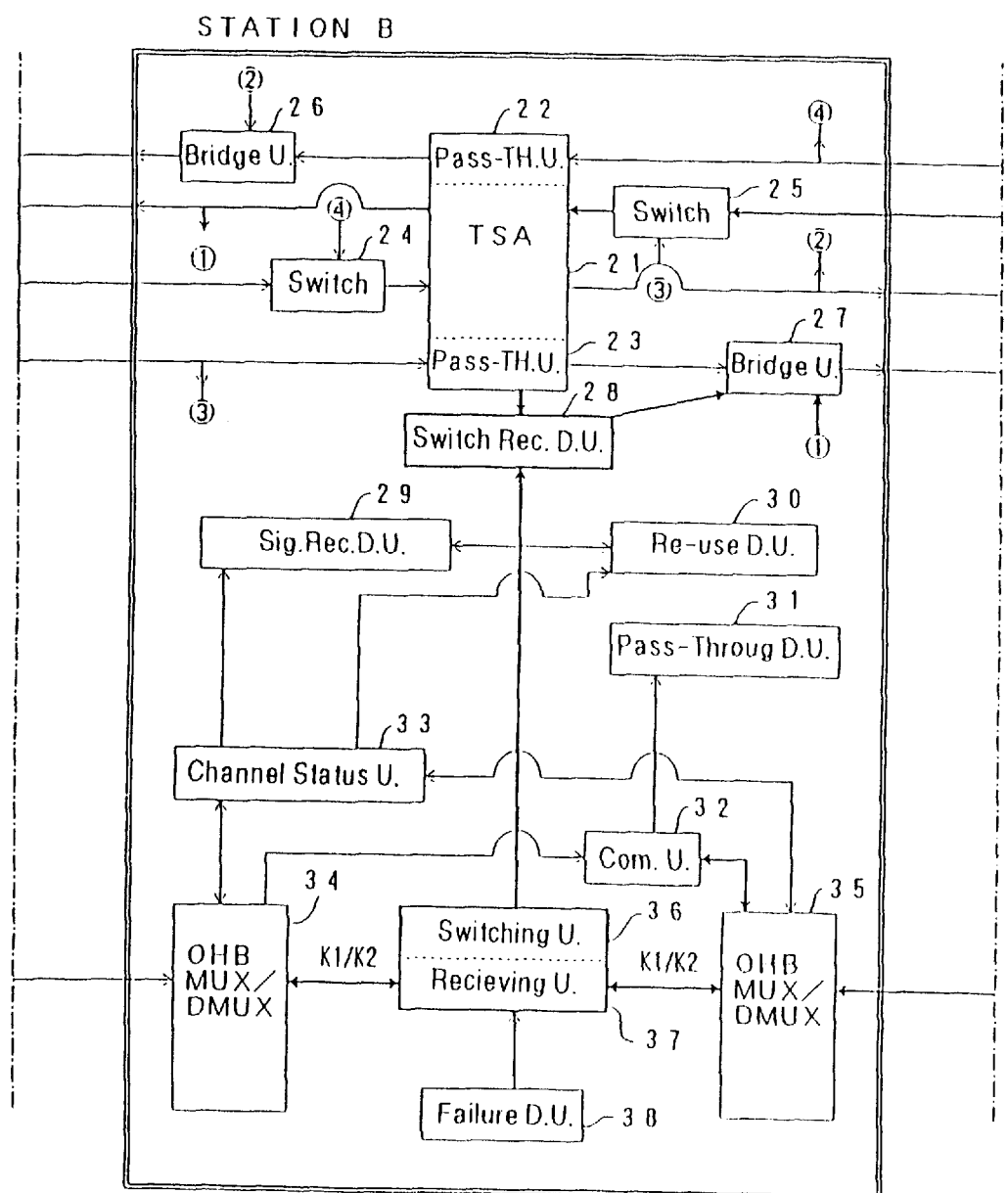
Figure 16:
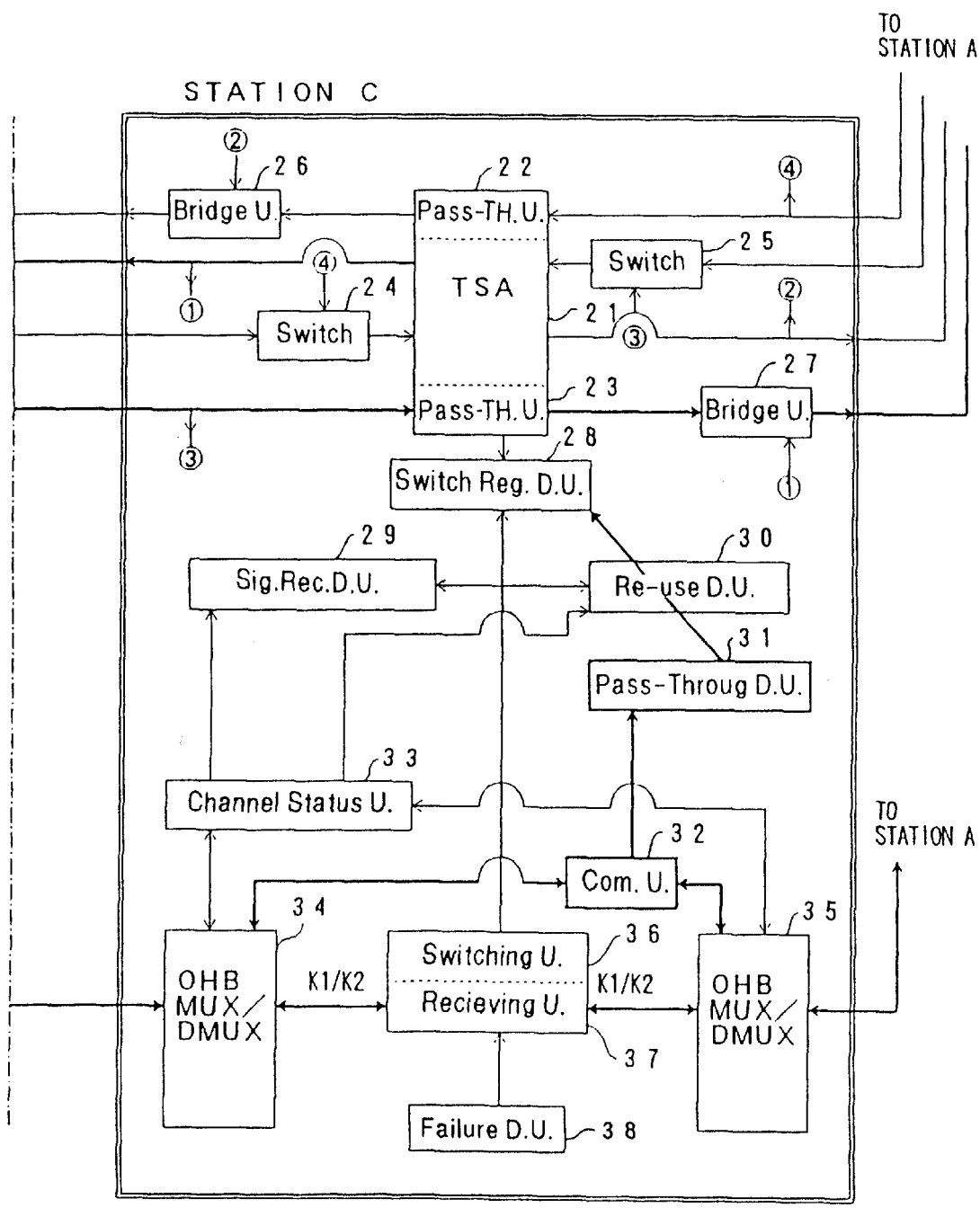

FIGS. 14, 15 and 16 show a failure condition of the network including the stations A, B, and C. FIG. 13 shows a relationship of the connection of FIGS. 14, 15 and 16. In the network, a failure in the lines between the stations A and B, similar to that shown in FIG. 6B, has occurred as shown in FIG. 14.

In the failure condition shown in FIGS. 14, 15 and 16, the occurrence of the failure in the lines between the stations A and B is detected by the failure detection unit 38 in the station A. The failure detection unit 38 outputs a detection signal to the line switching unit 36. In response to the detection signal, the line switching unit 36 outputs a switch command to the switch request determination unit 28. In response to this switch command, the switch request determination unit 28 controls the switch unit 25 in accordance with the channel setting data stored in an internal memory of the TSA unit 21 in the station A. The switch unit 25 in the station A performs a switching connection from the PRT CH line to the WRK CH line and connects the WRK CH line between the stations A and C under the control of the switch request determination unit 28. The communication unit 32 in the station A notifies the stations C and B of the above line switching. That is, the switching data related to the above line switching is transmitted by the communication 32 to the stations C and B.

In the station C shown in FIG. 16, the communication unit 32 receives the switching data from the station A, and outputs the switching data to the pass-through determination unit 31. The pass-through determination unit 31 in the station C outputs a pass-through command to the pass-through unit 23. The pass-through unit 23 performs a pass-through connection of the PRT CH line, and this PRT CH line is specified by the switching data. The switch data receiving unit 37 in the station C passes the control data including the K1/K2 bytes.

In the station B shown in FIG. 15, the switch data receiving unit 37 receives the control data including the K1/K2 bytes from the station A, and outputs the K1/K2 bytes to the line switching unit 36. In response to this control data, the line switching unit 36 notifies the switch request determination unit 28 of the above line switching. The line switching unit 36 outputs a switch command to the switch request determination unit 28. In response to this switch command, the switch request determination unit 28 controls the bridge unit 27 in accordance with the channel setting data stored in the internal memory of the TSA unit 21 in the station B. The bridge unit 27 in the station B performs a switching connection from the WRK CH line to the PRT CH line and connects the PRT CH line between the stations C and B under the control of the switch request determination unit 28. The communication unit 32 in the station B terminates the switching data.

Accordingly, upon the occurrence of the failure, the bypass transmission path described above is established, and the communication service between the stations A and B can continue to be provided by using the bypass transmission path.

The switching condition of the switch units and/or the bridge units can be transmitted from one station to the adjacent station by using the control data of the overhead of the STS signal through the communication unit 32. The station in which the line switching is carried out terminates the received control data of the overhead, and the station in which the line switching is not carried out passes the received control data of the overhead to the adjacent station.

Figure 17:
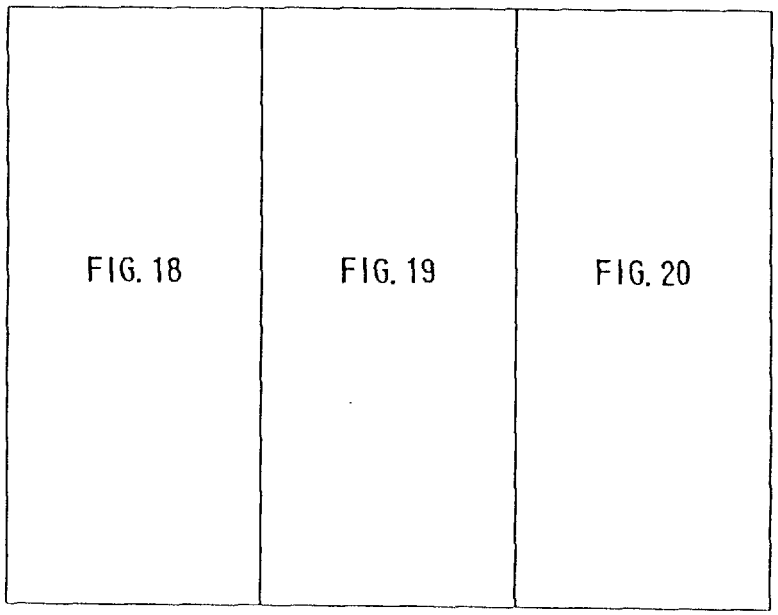
FIG. 17 is a diagram showing a relationship of the connection of FIGS. 18, 19 and 20.
Figure 18:
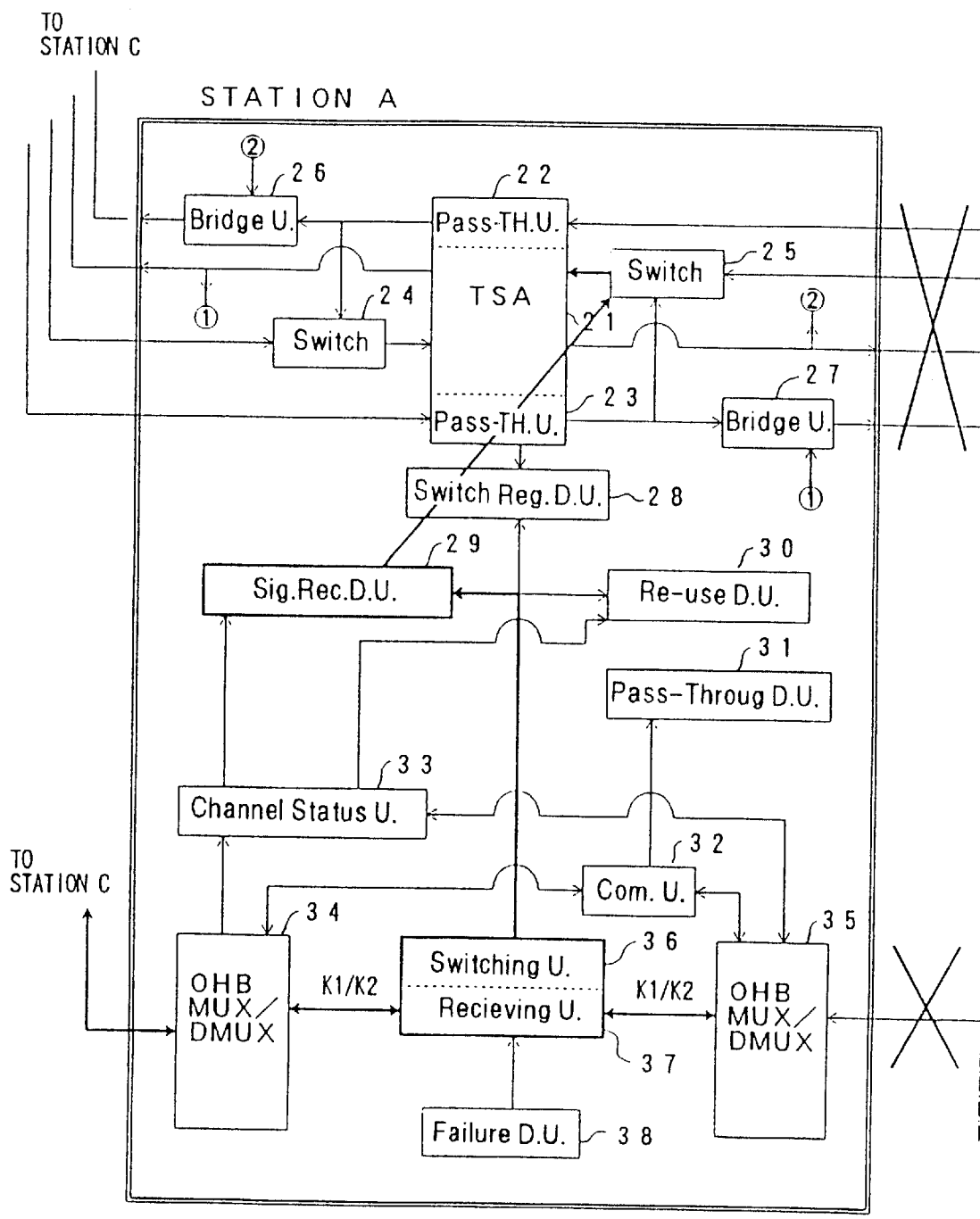
FIGS. 18, 19 and 20 are diagram showing a condition of the network including the communication device in FIG. 7 and the other communication devices upon occurrence of a multiple failure.
Figure 19:
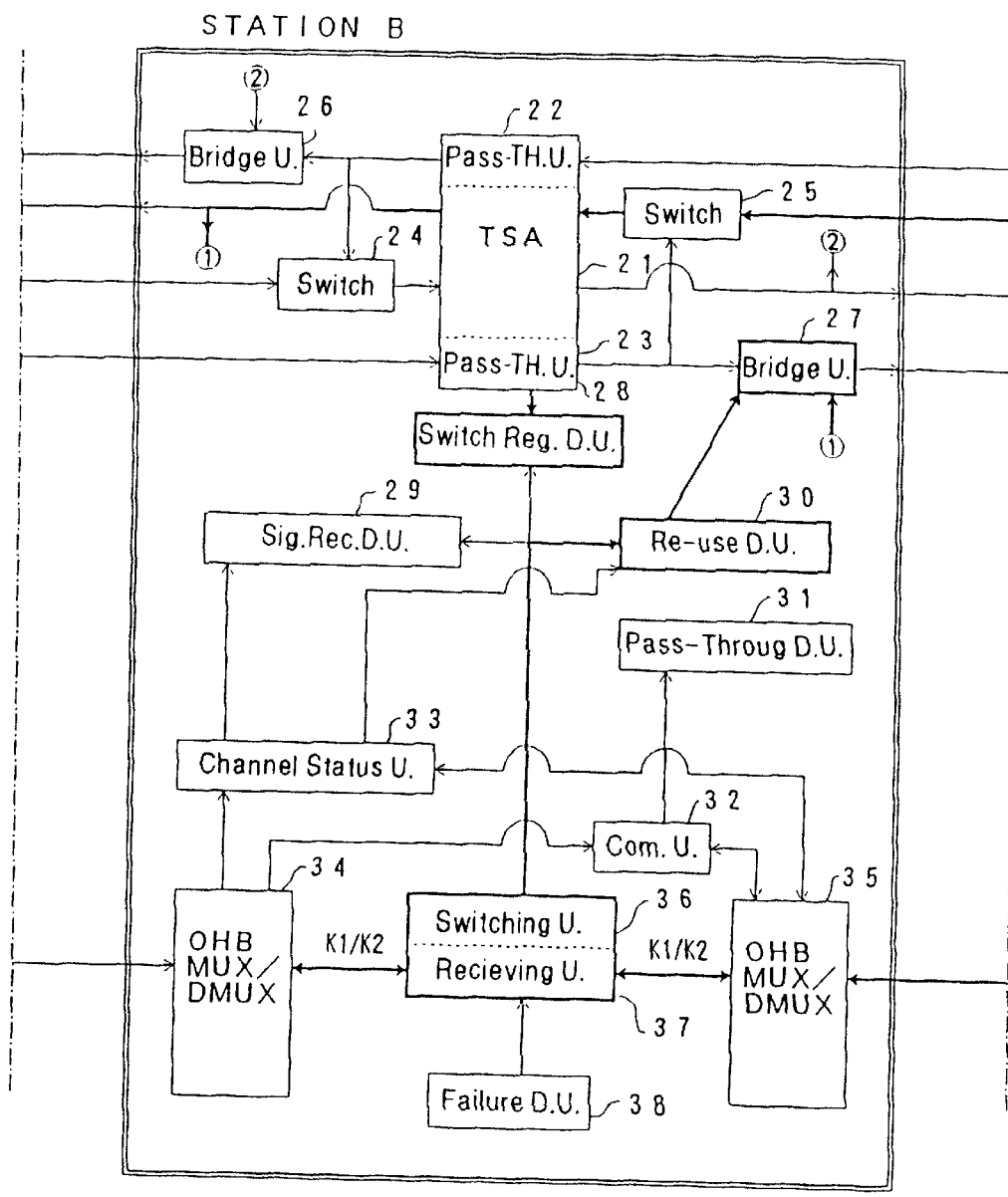
Figure 20:
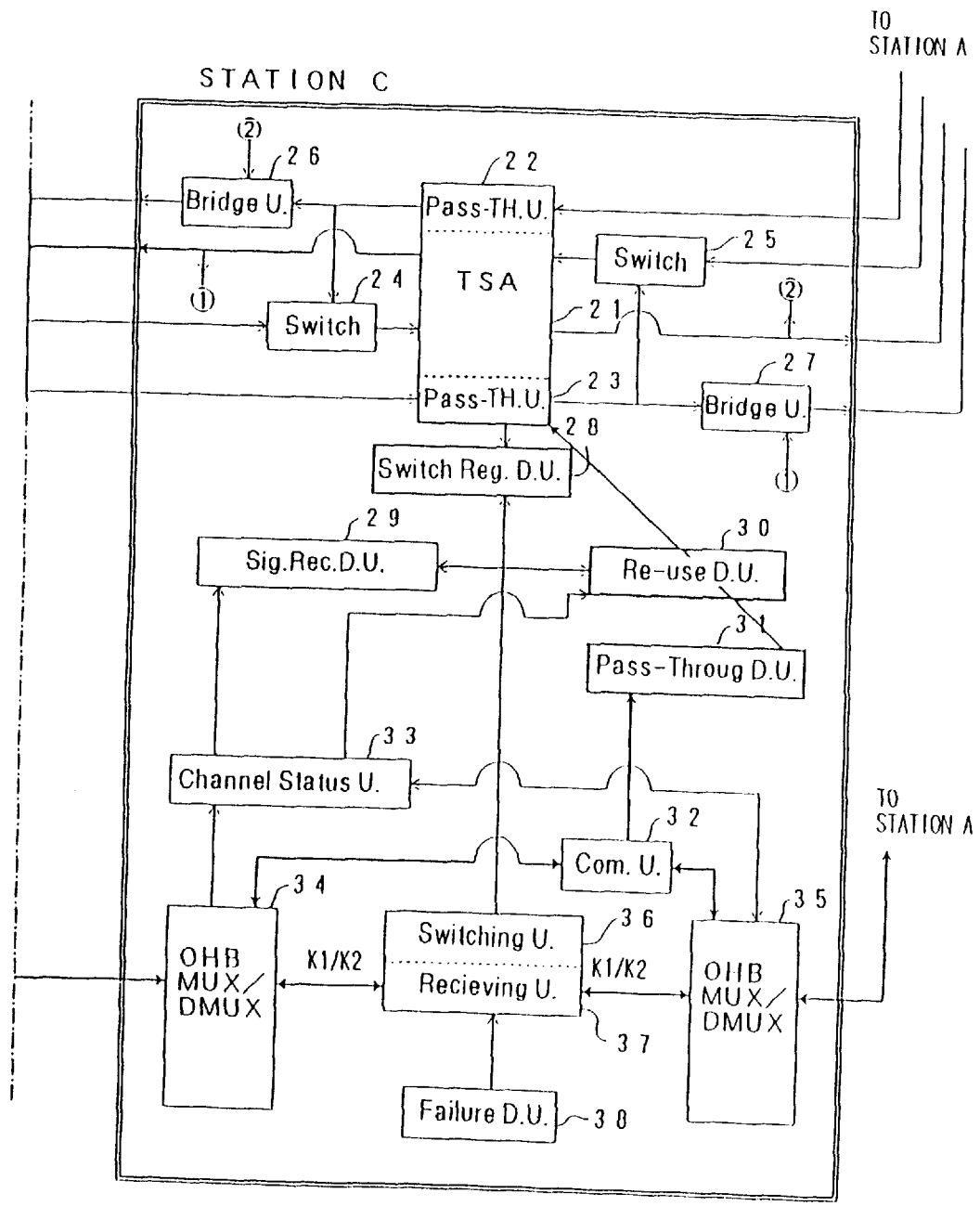

FIGS. 18, 19, and 20 show another failure condition of the network including the stations A, B, and C. Suppose that there are other stations between the stations C and A, and the stations C and A and the other stations are connected together in the network in a ring formation. In the network shown in FIGS. 18, 19 and 20, the first failure in the lines between the stations A and B occurs and a second failure in the lines between the other stations (interposed between the stations C and A) has occurred, similar to the failure condition shown in FIG. 6C. FIG. 17 shows a relationship of the connection FIGS. 18, 19, and 20.

In the failure condition shown in FIGS. 18, 19 and 20, the second failure has occurred in the lines between the other stations (interposed between the stations C and A), in addition to the first failure having occurred in the lines between the stations A and B. The occurrence of the second failure is detected by one of the other stations. In the station A, shown in FIG. 18, the switch data receiving unit 37 receives the K1/K2 bytes of the control data from one of the other stations (different from the station B), and supplies the data, indicating the second failure having occurred, to the line switching unit 36. The line switching unit 36 of the station A supplies a far-end station identification (FAR END ID) signal to the signal recovery determination unit 29. The FAR END ID signal indicates an identification of a far end station with which the station A can communicate. In response to the FAR END ID signal, the signal recovery determination unit 29 at this time allows the switch unit 25 to be returned to the original switching condition of the working channel line. Since the switch data from the station A is terminated by the other station between the stations A and C, the communication unit 32 of the station A notifies the communication unit 32 of the station C that there is no switch data related to the station A.

In the station C shown in FIG. 20, the notification from the station A is supplied by the communication unit 32 to the pass-through determination unit 31. The pass-through determination unit 31 at this time cancels the pass-through condition of the pass-through unit 23 according to the above notification. The switch data receiving unit 37 of the station C receives the K1/K2 bytes of the control data from the other station (different from the station A), and supplies the data to the line switching unit 36. The line switching unit 36 of the station C continues to output a pass-through command to the reuse determination unit 30.

In the station B shown in FIG. 19, the switch data receiving unit 37 of the station B receives the K1/K2 bytes of the control data from the other station (different from the station A), and supplies the data to the line switching unit 36. The line switching unit 36 notifies the reuse determination unit 30 that a request for the reuse of the PRT CH line has been issued to the station B. In response to this request, the reuse determination unit 30 determines a channel on the PRT CH line according to the channel use condition from the channel status unit 33, and outputs a reuse command to the bridge unit 27 for the determined channel. The bridge unit 27 of the station B cancels the bridge-on condition for the channel of the PRT CH line according to the reuse command from the reuse determination unit 30.

The reuse determination unit 30 allows the bridge unit 26 and/or the bridge unit 27 to be returned to the original switching condition only when the reuse of the protection channel line, which had been used for the bypass transmission path, is needed upon the occurrence of the multiple failure condition. However, the reuse determination unit 30 does not always allow the bridge unit 26 and/or the bridge unit 27 to be returned to the original switching condition, and the reuse of the protection channel line may be modified to provide another communication service.

Figure 21:
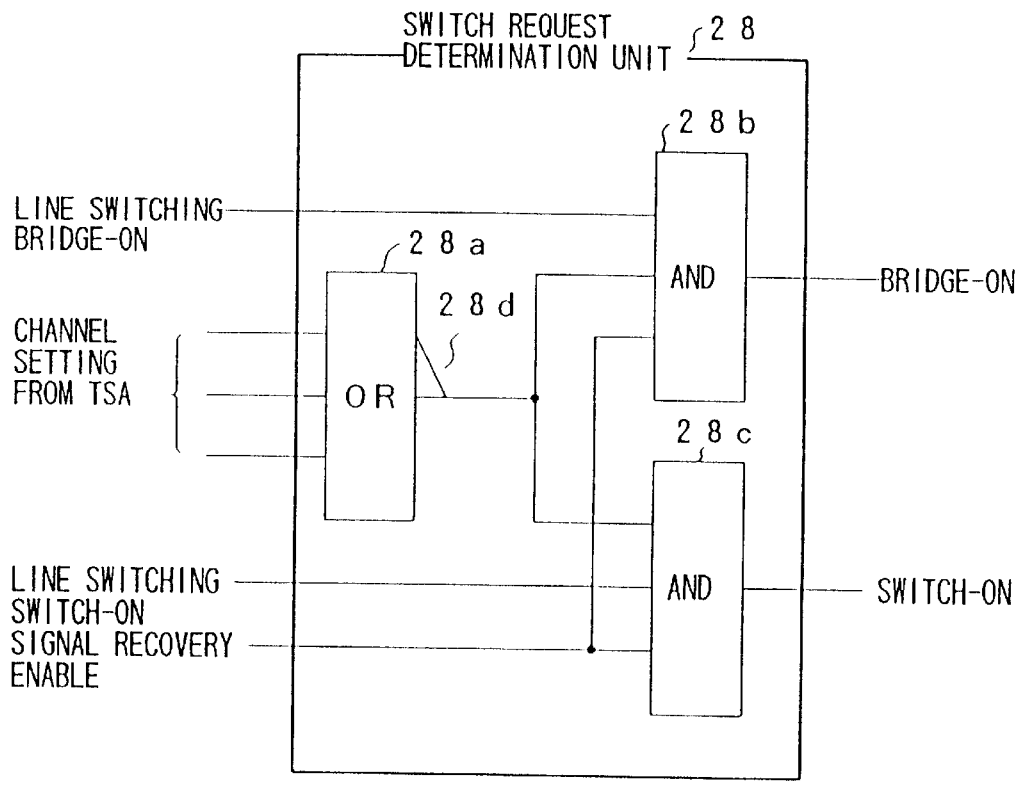
FIG. 21 is a block diagram of a switch request determination unit of the communication device in FIG. 7.

FIG. 21 shows the details of the switch request determination unit 28 of the communication device in FIG. 7. Referring to FIG. 21, the switch request determination unit 28 includes an OR circuit 28a, AND circuits 28b and 28c, and an inverter 28d connected to an output of the OR circuit 28a.

In the switch request determination unit 28, channel setting signals from the TSA unit 21 are input to the OR circuit 28a. The channel setting signals are ON/OFF signals stored in a memory of the TSA unit 21, and these signals indicate any of an ADD connection, a DROP connection, a THROUGH connection, and no channel setting request.

If the channel setting signals input to the OR circuit 28a indicate at least one of the ADD connection, the DROP connection and the THROUGH connection, an ON signal is generated at an output of the inverter 28d. The ON signal output from the inverter 28d is sent to an input of the AND circuit 28b and to an input of the AND circuit 28c.

The ON signal from the inverter 28d, a bridge-on signal from the line switching unit 36, and a signal recovery enable signal from the signal recovery determination unit 29 are input to and received by the AND circuit 28b. If all the three signals input to the AND circuit 28b are ON, a bridge-on request signal is generated at an output of the AND circuit 28b.

The ON signal from the inverter 28d, a switch-on signal from the line switching unit 36, and the signal recovery enable signal from the signal recovery determination unit 29 are input to and received by the AND circuit 28c. If all the signals, input to the AND circuit 28c, are ON, the AND circuit 28c generates a switch-on signal at an output of the AND circuit 28c.

Accordingly, the AND circuit 28b of the switch request determination unit 28 outputs a bridge-on signal at a time the bridge-on signal is turned ON under the condition that at least one of the channel setting signals, indicating any of the ADD connection, the DROP connection and the THROUGH connection, is ON and the signal recovery enable signal is ON. The AND circuit 28c of the switch request determination unit 28 outputs a switch-on signal at a time the switch-on signal is turned ON under the condition that at least one of the channel setting signals, indicative any of the ADD connection, the DROP connection and the THROUGH connection, is ON and the signal recovery enable signal is ON.

Accordingly, the switch request determination unit 28 does not perform a switching connection from the working channel line to the protection channel line or vice versa for an unused channel to which a channel setting is not made.

For the sake of simplicity of the communication device, the signal recovery enable signal and the circuits for outputting the same may be omitted.

Figure 22:
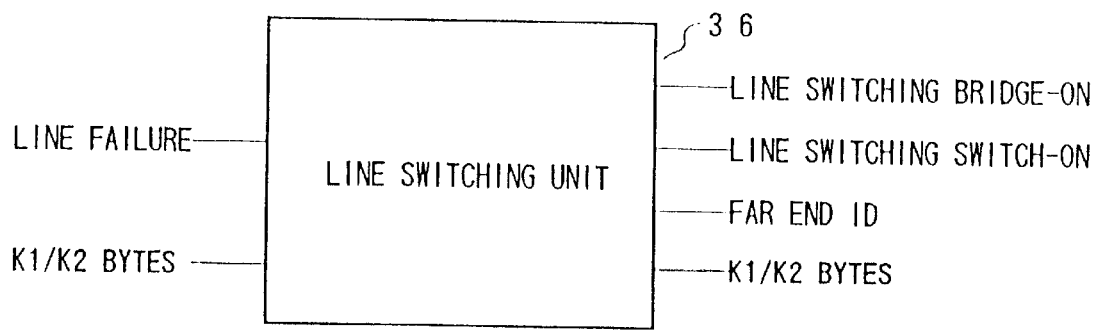
FIG. 22 is a block diagram of a line switching unit of the communication device in FIG. 7.

FIG. 22 shows inputs and outputs of the line switching unit 36 of the communication device in FIG. 7. Referring to FIG. 22, the line failure signal from the failure detection unit 38 and the K1/K2 bytes from another station are input to the line switching unit 36. The line switching unit 36 outputs the bridge-on signal, the switch-on signal, a far-end station identification (FAR END ID) signal, and the K1/K2 bytes.

The far-end station identification (FAR END ID) signal, output by the line switching unit 36, indicates an identification code to identify a far-end station of the other communication device which the present communication device can communicate with. Upon the occurrence of a single failure, the FAR END ID signal constitutes the destination-station identification signal. The line failure signal is output by the failure detection unit 38, and this signal is input to and received by the line switching unit 36.

Figure 23:
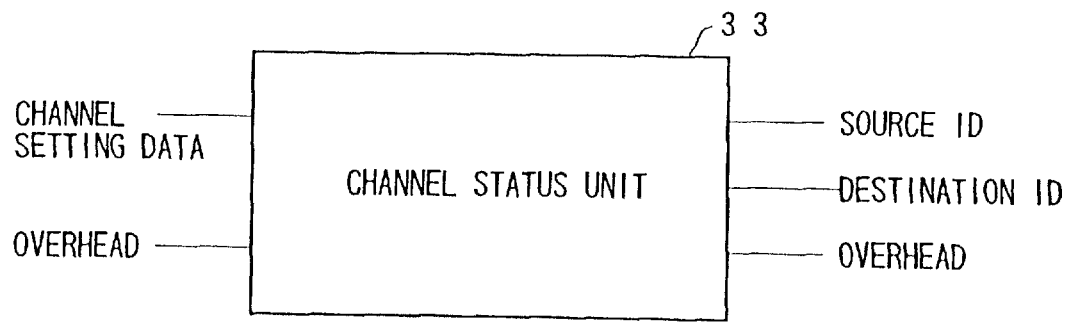
FIG. 23 is a block diagram of a channel status acquisition unit of the communication device in FIG. 7.

FIG. 23 shows inputs and outputs of the channel status unit 33 of the communication device in FIG. 7. Referring to FIG. 23, the channel setting data and the overhead data, sent from the TSA unit 21, are input to and received by the channel status unit 33. The channel status unit 33 outputs a source-station identification (SOURCE ID) signal, a destination-station identification (DESTINATION ID) signal, and the overhead data. The SOURCE ID and the DESTINATION ID are described in the overhead data received by the channel status unit 33. The SOURCE ID and DESTINATION ID signals from the channel status unit 33 are sent to the signal recovery unit 29 and to the re-use determination unit 30.

Figure 24:
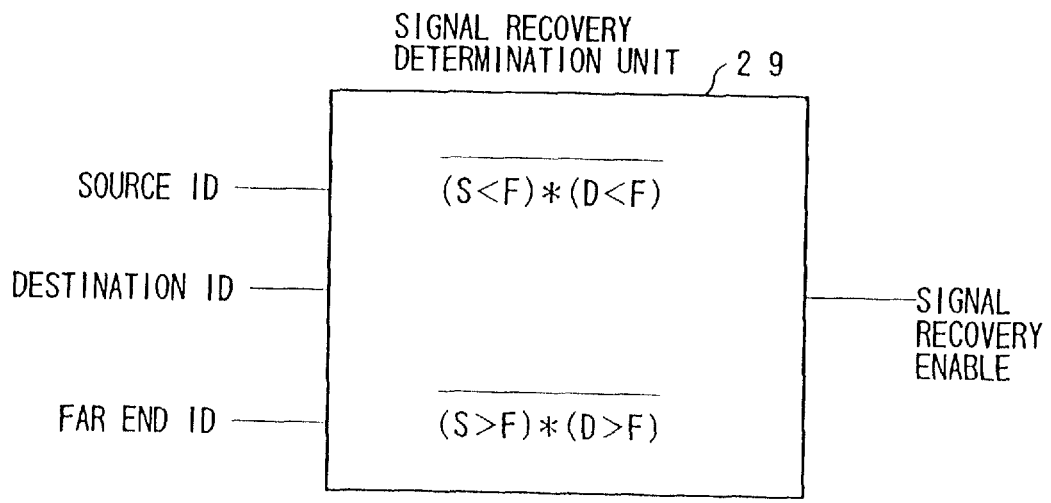
FIG. 24 is a block diagram of a signal recovery determination unit of the communication device in FIG. 7.

FIG. 24 shows inputs and outputs of the signal recovery determination unit 29 of the communication device in FIG. 7. Referring to FIG. 24, the source-station identification (SOURCE ID) signal, the destination-station identification (DESTINATION ID) signal, and the far-end station identification (FAR END ID) signal are input to and received by the signal recovery determination unit 29.

The SOURCE ID signal indicates an identification code to identify the source station of the communication device, and an ADD setting is made to the source station. The DESTINATION ID signal indicates an identification code to identify the destination station of the communication device, and a DROP setting is made to the destination station.

By using a known determination method, the signal recovery determination unit 29 determines whether the signal recovery can be performed. The known determination method is to execute logic operations such as those shown in FIG. 24, in accordance with the input signals received by the signal recovery determination unit 29. If it is determined that the signal recovery can be performed, the signal recovery determination unit 29 outputs a signal recovery enable signal. In FIG. 24, "S", "D", and "F" indicate a value of the SOURCE ID, a value of the DESTINATION ID, and a value of the FAR END ID, respectively.

Further, the present invention is not limited to the above-described embodiment, and variations and modifications may be made without departing from the scope of the present invention.

What is claimed is:

1. A communication device provided within a network in which signals are transmitted bidirectionally on transmission lines, the transmission lines including working channel lines and protection channel lines, said communication device comprising:
 a time switch array unit performing a switching of the transmission lines;
 a switch unit performing a switching connection from one protection channel line among the transmission lines to a predetermined working channel line, for each channel formed in the transmission lines;
 a bridge unit performing a switching connection from one working channel line among the transmission lines to a predetermined protection channel line, for each channel formed in the transmission lines;
 a control unit performing a recovery of a signal transmission on the working channel lines by controlling the switching connections of said switch unit and said bridge unit; and
 wherein said control unit comprises:
  a failure detection unit detecting a failure in the transmission lines connected to the communication device;
  a line switching unit outputting a switch command which commands a switching connection of at least one of said switch unit and said bridge unit when the failure is detected by said failure detection unit; and
  a switch request determination unit allowing, in response to the switch command from said line switching unit, said at least one of said switch unit and said bridge unit to perform the switching connection to a selected channel line among the transmission lines in accordance with channel setting data stored in said time switch array unit.

2. The communication device according to claim 1, wherein said transmission lines include: a first optical fiber cable having a first transmission direction, in which working channels and protection channels are formed; and a second optical fiber cable having a second transmission direction, in which the working channels and the protection channels are formed.

3. The communication device according to claim 1, wherein said transmission lines include: a first optical fiber cable having a first transmission direction, in which working channels are formed; a second optical fiber cable having the first transmission direction, in which protection channels are formed; a third optical fiber cable having a second transmission direction, in which the working channels are formed; and a fourth optical fiber cable having the second transmission direction, in which the protection channels are formed.

4. A communication device provided within a network in which signals are transmitted bidirectionally on transmission lines, the transmission lines including working channel lines and protection channel lines, said communication device comprising:
 a time switch array unit performing a switching of the transmission lines;
 a switch unit performing a switching connection from one protection channel line among the transmission lines to a predetermined working channel line, for each channel formed in the transmission lines;
 a bridge unit performing a switching connection from one working channel line among the transmission lines to a predetermined protection channel line, for each channel formed in the transmission lines;
 a control unit performing a recovery of a signal transmission on the working channel lines by controlling the switching connections of said switch unit and said bridge unit;
 a pass-through unit passing the signal on one of the transmission lines; and
 wherein said control unit comprises:
  a signal recovery determination unit determining whether a recovery of a signal transmission on one of the transmission lines is allowed upon occurrence of a failure,
  said switch request determination unit controlling the switching connections of the switch unit and the bridge unit when said signal recovery determination unit determines that the recovery of the signal is allowed.

5. The communication device according to claim 3, wherein said signal recovery determination unit allows the switch unit to be returned to an original switching condition when said signal recovery determination unit determines that the recovery of the signal transmission on said one of the transmission lines upon the occurrence of the failure is not allowed.

6. A communication device provided within a network in which signals are transmitted bidirectionally on transmission lines, the transmission lines including working channel lines and protection channel lines, said communication device comprising:
 a time switch array unit performing a switching of the transmission lines;
 a switch unit performing a switching connection from one protection channel line among the transmission lines to a predetermined working channel line, for each channel formed in the transmission lines;
 a bridge unit performing a switching connection from one working channel line among the transmission lines to a predetermined protection channel line, for each channel formed in the transmission lines;
 a control unit performing a recovery of a signal transmission on the working channel lines by controlling the switching connections of said switch unit and said bridge unit;
 a communication unit transmitting control data to and receiving control data from an external communication device, said control data relating to a switching condition of said external communication device;
 said control unit comprising:
  a pass-through determination unit controlling a switching of said pass-through unit in accordance with the switching condition of said control data received by said communication unit.

7. A communication device provided within a network in which signals are transmitted bidirectionally on transmission lines, the transmission lines including working channel lines and protection channel lines, said communication device comprising:
 a time switch array unit performing a switching of the transmission lines;
 a switch unit performing a switching connection from one protection channel line among the transmission lines to a predetermined working channel line, for each channel formed in the transmission lines;

a bridge unit performing a switching connection from one working channel line among the transmission lines to a predetermined protection channel line, for each channel formed in the transmission lines;

a control unit performing a recovery of a signal transmission on the working channel lines by controlling the switching connections of said switch unit and said bridge unit;

a communication unit transmitting control data to and receiving control data from an external communication device, said control data relating to a switching condition of said external communication device, and said control unit comprising:

a reuse determination unit allowing said bridge unit to be returned to an original switching condition in accordance with said switching condition of said control data received by said communication unit.

* * * * *